(12) United States Patent
Kitajima et al.

(10) Patent No.: US 10,493,540 B2
(45) Date of Patent: Dec. 3, 2019

(54) CUTTING INSERT AND INDEXABLE CUTTING TOOL

(71) Applicant: MITSUBISHI MATERIALS CORPORATION, Tokyo (JP)

(72) Inventors: Jun Kitajima, Tokyo (JP); Toshimitsu Furuki, Tokyo (JP); Shigeru Ishimori, Tokyo (JP); Kiichi Yamazaki, Tokyo (JP); Takayuki Hagiwara, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/759,635

(22) PCT Filed: Sep. 15, 2016

(86) PCT No.: PCT/JP2016/077281
§ 371 (c)(1),
(2) Date: Mar. 13, 2018

(87) PCT Pub. No.: WO2017/047700
PCT Pub. Date: Mar. 23, 2017

(65) Prior Publication Data
US 2018/0257155 A1 Sep. 13, 2018

(30) Foreign Application Priority Data
Sep. 15, 2015 (JP) .................................. 2015-181680

(51) Int. Cl.
*B23C 5/20* (2006.01)
*B23C 5/24* (2006.01)
*B23C 5/10* (2006.01)

(52) U.S. Cl.
CPC .............. *B23C 5/2472* (2013.01); *B23C 5/10* (2013.01); *B23C 5/20* (2013.01); *B23C 2200/0438* (2013.01); *B23C 2210/202* (2013.01)

(58) Field of Classification Search
CPC ...... B23C 2200/0438; B23C 2210/202; B23C 5/20; B23C 2210/20; B23C 5/2213;
(Continued)

(56) References Cited

U.S. PATENT DOCUMENTS 5,145,295 A * 9/1992 Satran .................... B23C 5/2213
407/113
5,209,611 A * 5/1993 Drescher ................... B23C 5/08
407/114

(Continued)

FOREIGN PATENT DOCUMENTS

CN 101274372 A 10/2008
CN 103842118 A 6/2014
(Continued)

OTHER PUBLICATIONS

Office Action dated Oct. 8, 2018, issued for the Chinese patent application No. 201680051252.4 and a partial English translation of the search report.
(Continued)

*Primary Examiner* — Sara Addisu
(74) *Attorney, Agent, or Firm* — Locke Lord LLP

(57) ABSTRACT

A minor cutting edge has a first minor cutting edge and a second minor cutting edge that extends inward of the insert in a direction of an insert short side face axial line, as the second minor cutting edge extends from the first minor cutting edge in a direction of an insert major face axial line. A flank face of the second minor cutting edge is inclined outward of the insert in the direction of the insert short side (Continued)

face axial line, as the flank face extends from the second minor cutting edge in the direction of an insert long side face axial line, and is inclined outward of the insert in the direction of the insert short side face axial line, as the flank face extends from a major face adjacent to the flank face in the direction of the insert major face axial line.

12 Claims, 20 Drawing Sheets

(58) Field of Classification Search
CPC ... B23C 2210/168; B23C 5/109; B23C 5/207; B23C 2200/085; B23C 2200/367
See application file for complete search history.

(56) References Cited

U.S. PATENT DOCUMENTS

| | | | | |
|---|---|---|---|---|
| 6,293,737 B1* | 9/2001 | Satran | ................... | B23C 5/2221 407/113 |
| 7,905,688 B2* | 3/2011 | Ertl | ........................... | B23C 5/10 407/113 |
| 8,979,440 B2* | 3/2015 | Ishi | ........................ | B23C 5/109 407/113 |
| 9,375,793 B2* | 6/2016 | Brunetto | ................. | B23C 5/207 |
| 9,993,884 B2* | 6/2018 | Fang | ..................... | B23C 5/2247 |
| 10,010,952 B2* | 7/2018 | Mao | ........................ | B23C 5/109 |
| 2011/0129309 A1* | 6/2011 | Kovac | ...................... | B23C 5/06 407/42 |
| 2012/0039678 A1* | 2/2012 | Nguyen | .................. | B23C 5/109 407/113 |
| 2013/0108388 A1 | 5/2013 | Ishi | | |
| 2013/0121775 A1 | 5/2013 | Dudzinsky et al. | | |
| 2014/0234037 A1 | 8/2014 | Horiike et al. | | |
| 2017/0291231 A1 | 10/2017 | Mao | | |

FOREIGN PATENT DOCUMENTS

| | | | | |
|---|---|---|---|---|
| EP | 1002608 A2 * | 5/2000 | ............ | B23C 5/2221 |
| JP | 2012161907 A * | 8/2012 | ........... | B23C 5/2213 |
| JP | 2013-103332 A | 5/2013 | | |
| JP | 2013-121636 A | 6/2013 | | |
| JP | 2016172294 A * | 9/2016 | ............... | B23C 5/20 |
| WO | 2012/021414 A1 | 2/2012 | | |
| WO | 2012/099153 A1 | 7/2012 | | |
| WO | 2013/051449 A1 | 4/2013 | | |
| WO | 2016/047795 A1 | 3/2016 | | |

OTHER PUBLICATIONS

Search Report dated Apr. 15, 2019, issued for the European patent application No. 16846571.4.
International Search Report dated Dec. 6, 2016, issued for PCT/JP2016/077281.

* cited by examiner

CUTTING INSERT AND INDEXABLE CUTTING TOOL

TECHNICAL FIELD

The present invention relates to a cutting insert of a so-called vertical cutting edge double-sided type, and an indexable cutting tool detachably mounted to an insert mounting seat of a tip outer peripheral portion of a tool main body rotated around a tool axial line. Priority is claimed on Japanese Patent Application No. 2015-181680, filed on Sep. 15, 2015, the content of which is incorporated herein by reference.

BACKGROUND ART

In the related art, an indexable cutting tool such as an indexable insert milling cutter that performs a tool rotating cutting process on a work material made of a metal material is known.

For example, Patent Document 1 below discloses an indexable insert milling cutter in which a cutting insert having a cutting edge is detachably mounted to an insert mounting seat formed in a tip outer peripheral portion of a tool main body rotating around the tool axial line. This indexable insert milling cutter includes the cutting insert of the so-called vertical cutting edge double-sided type.

The cutting insert of the vertical cutting edge double-sided type has a rectangular plate shape, and is formed in a reversibly symmetrical shape. In addition, the cutting insert of the vertical cutting edge double-sided type includes a pair of major faces, that are front and rear faces, and a side face connecting peripheral edges of the pair of major faces. The side face includes four faces arrayed in a circumferential direction on an outer periphery of the cutting insert. The side face includes a pair of long side faces arranged to mutually face backward (arranged back to back), and a pair of short side faces arranged to mutually face backward and connecting the pair of long side faces to each other. In addition, a major cutting edge is formed in an intersection ridge portion between the major face and the long side face. A minor cutting edge is formed in an intersection ridge portion between the long side face and the short side face.

In Patent Document 1, as shown in FIG. 3 of Patent Document 1, a minor cutting edge 7 is connected to a major cutting edge 6 via a nose R-portion 8 (corner cutting edge). The minor cutting edge 7 is formed corresponding to an edge length indicated by a blade width t, and functions as a flat drag (flat cutting edge). In addition, as shown in FIGS. 1 and 4 of Patent Document 1, a parallelogram-shaped first face 5a serving as a flank face of the minor cutting edge 7, and a second face 5b and a third face 5c that are arranged on both sides of the first face 5a and respectively have a triangular shape are formed on an end face 5 that is the short side face.

When this cutting insert is mounted to the insert mounting seat of the tool main body, as shown in FIG. 8 of Patent Document 1, the second face 5b and the third face 5c on the end face 5 abut against seat side faces 22c and 22d facing a tool distal end side in the insert mounting seat.

CITATION LIST

Patent Literature

[Patent Document 1] Japanese Unexamined Patent Application, First Publication No. 2013-121636

SUMMARY OF INVENTION

Technical Problem

However, the above-described indexable insert milling cutter in the related art has the following problems.

According to Patent Document 1, it is possible to perform a face milling operation or a shoulder milling operation on a work material. However, the minor cutting edge functions as only a flat cutting edge for a finish operation. A cutting edge for a ramping operation (hereinafter, the cutting edge is referred to as a "ramping cutting edge") is not formed in the minor cutting edge. Thus, the ramping operation cannot be performed.

Here, the ramping operation will be described. FIG. 19 herein is a view for describing the ramping operation. In an example shown in FIG. 19, a cutting insert 101 of a horizontal cutting edge single-sided type is mounted to an insert mounting seat of a tool main body 100. In the ramping operation, a tool rotating cutting process is performed as follows. While the tool main body 100 is rotated around a tool axial line O, as shown by an arrow in FIG. 19, the tool main body 100 is moved relative to a work material W in a tool radial direction (right side in FIG. 19) and to a tool distal end side (lower side in FIG. 19) so as to move diagonally downward in a horizontal direction. In this manner, a major cutting edge 102, a flat cutting edge 103, and a ramping cutting edge 104 of the cutting insert 101 respectively cut into the work material W. For example, a pocket hole digging operation (deep digging operation) can be performed.

In addition, according to Patent Document 1, when the cutting insert is mounted to the insert mounting seat, a contact area is not sufficiently secured between the second face 5b and the third face 5c on the short side face of the cutting insert and the seat side faces 22c and 22d facing the tool distal end side of the insert mounting seat. Therefore, it is difficult to stably fix the cutting insert to the insert mounting seat. That is, Patent Document 1 has room for improvement in improving mounting stability by suppressing rattling of the cutting insert with respect to the insert mounting seat.

In Patent Document 1, the first face 5a of the short side face is formed in one plane serving as a flank face of a pair of minor cutting edges 7 located at both ends of the short side face. Therefore, there is a problem in that a tool angle or a clearance angle of the minor cutting edge 7 is likely to be limited. The limitation on the tool angle or the clearance angle of the minor cutting edge 7 affects cutting performance such as defect resistance and operation accuracy of an edge tip.

The present invention is made in view of the above-described circumstances, and an object thereof is to provide a cutting insert that can perform not only a face milling operation or a shoulder milling operation but also a ramping operation, that can improve mounting stability of the cutting insert mounted to an insert mounting seat during a tool rotating cutting process, and that can improve cutting performance, and to provide an indexable cutting tool using the cutting insert.

Solution to Problem

In order to solve this problem and achieve the above-described object, an embodiment according to the present invention proposes the following means.

That is, as an embodiment according to the present invention, there is provided a cutting insert formed in a rectangular plate shape and a reversibly symmetrical shape. The cutting insert includes a pair of major faces serving as front and rear faces of the cutting insert, a side face that includes a pair of long side faces and a pair of short side faces connecting the pair of long side faces to each other, and that connects peripheral edges of the pair of major faces to each other, a major cutting edge formed in an intersection ridge portion between the major face and the long side face, and a minor cutting edge formed in an intersection ridge portion between the long side face and the short side face. An imaginary straight line passing through each center of the pair of major faces is set as an insert major face axial line. An imaginary straight line passing through each center of the pair of long side faces is set as an insert long side face axial line. An imaginary straight line passing through each center of the pair of short side faces is set as an insert short side face axial line. The minor cutting edge has a first minor cutting edge that is connected to the major cutting edge via a corner cutting edge, and a second minor cutting edge that is connected to an end portion of the first minor cutting edge on a side opposite to the major cutting edge, and that extends so as to be inclined inward of the insert in a direction of the insert short side face axial line, as the second minor cutting edge extends from the end portion of the first minor cutting edge in a direction of the insert major face axial line, in a directional view of the insert long side face axial line. A flank face of the second minor cutting edge formed on the short side face is inclined outward of the insert in the direction of the insert short side face axial line, as the flank face extends from the second minor cutting edge in the direction of the insert long side face axial line, in a directional view of the insert major face axial line, and is inclined outward of the insert in the direction of the insert short side face axial line, as the flank face extends from the major face adjacent to the flank face of the second minor cutting edge in the direction of the insert major face axial line, in a directional view of the insert long side face axial line. The length of a flank face of the first minor cutting edge formed on the short side face is shortened in the direction of the insert major face axial line, as the flank face extends from the first minor cutting edge in the direction of the insert long side face axial line, in a directional view of the insert short side face axial line. The flank faces of the pair of first minor cutting edges formed on the short side face are formed in mutually different planes.

In addition, as another embodiment according to the present invention, there is provided an indexable cutting tool including a tool main body rotated around a tool axial line, a recessed insert mounting seat formed in a tip outer peripheral portion of the tool main body, and a cutting insert detachably mounted to the insert mounting seat. As the cutting insert, the above-described cutting insert is used. The insert mounting seat has a major face mounting wall that faces outward in a tool radial direction orthogonal to a tool axial line, and that abuts against the major face, a long side face mounting wall that faces a tool rotation direction in a tool circumferential direction around the tool axial line, and that abuts against the long side face, and a short side face mounting wall that faces a distal end side in a direction of the tool axial line, and that abuts against the flank face of the second minor cutting edge located outward in the tool radial direction, in the flank faces of the pair of second minor cutting edges formed on the short side face.

The cutting insert as the embodiment according to the present invention is a so-called vertical cutting edge double-sided type. The cutting insert is detachably mounted to the insert mounting seat formed in the tip outer peripheral portion of the tool main body rotated around the tool axial line, and is used for a tool rotating cutting process.

If this cutting insert is mounted to the insert mounting seat, one major face of the pair of major faces of the cutting insert abuts against the major face mounting wall that faces outward in the tool radial direction (direction orthogonal to the tool axial line) in the insert mounting seat. The other major face is disposed to face outward in the tool radial direction, and is set to serve as the flank face of the major cutting edge. In addition, one long side face of the pair of long side faces of the cutting insert abuts against the long side that faces the tool rotation direction (in the tool circumferential direction around the tool axial line, a direction in which the tool main body is rotated during the tool rotating cutting process) in the insert mounting seat. The other long side face is disposed to face the tool rotation direction, and is set to serve as the rake face of the major cutting edge and the minor cutting edge. In addition, one short side face in the pair of short side faces of the cutting insert abuts against the short side face of one of a pair of the short side faces of the cutting insert abuts against the short side face mounting wall that faces the tool distal end side (distal end side along the direction of the tool axial line) in the insert mounting seat. The other short side face is disposed to face the tool distal end side, and is set to serve as the flank face of the minor cutting edge.

According to the cutting insert and the indexable cutting tool using the cutting insert as the embodiment of the present invention, the minor cutting edge of the cutting insert has the first minor cutting edge and the second minor cutting edge. The first minor cutting edge is connected to the major cutting edge. The second minor cutting edge is connected to the end portion of the first minor cutting edge on the side opposite to the major cutting edge. The second minor cutting edge extends so as to be inclined inward of the insert in the direction of the insert short side face axial line, as the second minor cutting edge extends from the end portion of the first minor cutting edge in the direction of the insert major face axial line. Therefore, for example, the first minor cutting edge of the minor cutting edge can be used as a cutting edge (flat cutting edge) for a finish operation, and the second minor cutting edge can be used as a cutting edge (ramping cutting edge) for a ramping operation.

Specifically, when the cutting insert is mounted to the insert mounting seat of the tool main body, the first minor cutting edge is disposed in an imaginary plane perpendicular to the tool axial line. In this manner, the first minor cutting edge can be used as the flat cutting edge. In addition, the second minor cutting edge is inclined toward a tool posterior side (posterior side along the direction of the tool axial line), as the second minor cutting edge extends inward in the tool radial direction from a portion connected to the first minor cutting edge. In this manner, the second minor cutting edge can be used as the ramping cutting edge.

In this manner, one indexable cutting tool enables not only the face milling operation or the shoulder milling (peripheral milling) operation to be performed on the work material, but also the pocket hole digging operation (deep digging operation) using the ramping operation, for example. Therefore, it is possible to intensively use tools by minimizing types of the tools. It is possible to continuously perform various tool rotating cutting processes, and it is possible to shorten an operation period of time.

In addition, the flank face of the second minor cutting edge formed on the short side face of the cutting insert is inclined outward of the insert in the direction of the insert short side face axial line, as the flank face extends from the second minor cutting edge in the direction of the insert long side face axial line. In this manner, a clearance angle of the second minor cutting edge when the cutting insert is viewed as a single body is set to a negative angle. Therefore, a large tool angle of the second minor cutting edge can be secured.

That is, when the second minor cutting edge is used as the ramping cutting edge as described above, strong cutting resistance is likely to act on the second minor cutting edge. However, the large tool angle of the second minor cutting tool is secured. Accordingly, edge tip strength can be increased, and a cutting edge defect is suppressed. Therefore, a stable tool rotating cutting process can be performed.

When the indexable cutting tool is viewed as a whole, a posture of the cutting insert mounted to the insert mounting seat is set as follows. In this manner, it is preferable that the clearance angle of the second minor cutting edge is substantially set to a positive angle (right angle). That is, the cutting insert is disposed in the insert mounting seat so that the flank face of the second minor cutting edge is inclined toward the tool posterior side as the flank face extends from the second minor cutting edge toward the side opposite to the tool rotation direction. In this manner, the clearance angle of the second minor cutting edge during the tool rotating cutting process can be substantially set to the positive angle. Furthermore, contact between the flank face of the second minor cutting edge and a machined surface of the work material is prevented, thereby enabling the tool rotating cutting process to be satisfactorily performed.

In addition, the clearance angle of the second minor cutting edge is set to the negative angle as a single body of the cutting insert. Accordingly, it is possible to obtain an advantageous effect of improving the mounting stability of the cutting insert mounted to the insert mounting seat.

Specifically, when the cutting insert is mounted to the insert mounting seat of the tool main body, as shown in FIGS. 3 and 4, the short side face mounting wall facing the tool distal end side in the insert mounting seat abuts against the flank face of the second minor cutting edge located outward in the tool radial direction, in the flank faces of the pair of second minor cutting edges of the short side face facing the short side face mounting wall. In addition, the long side face mounting wall facing the tool rotation direction in the insert mounting seat abuts against the long side face facing the long side face mounting wall. Therefore, when the cutting insert is viewed inward in the tool radial direction (the major face is viewed from the front in the direction of the insert major face axial line), an angle (a first insert restriction angle, an angle indicated by the reference numeral θ1 in FIG. 16) formed between the short side face mounting wall and the long side face mounting wall of the insert mounting seat can be set to be smaller than 90°. Therefore, a pulling force (force in an arrow direction indicated by the reference numeral F1 in FIG. 16) acting toward an apex side of the angle can be generated for the cutting insert restricted by the short side face mounting wall and the long side face mounting wall of the insert mounting seat. In this manner, rattling (floating) of the cutting insert is suppressed during the tool rotating cutting process, and thus, mounting stability can be improved.

In addition, the flank face of the second minor cutting edge is inclined outward of the insert in the direction of the insert short side face axial line, as the flank face extends from the major face adjacent to the flank face in the direction of the insert major face axial line. Therefore, according to this configuration, it is also possible to obtain an advantageous effect of improving the mounting stability of the cutting insert mounted to the insert mounting seat.

Specifically, when the cutting insert is mounted to the insert mounting seat of the tool main body, as shown in FIG. 3, the short side face mounting wall facing the tool distal end side in the insert mounting seat abuts against the flank face of the second minor cutting edge located outward in the tool radial direction, in the flank faces of the pair of second minor cutting edges of the short side face facing the short side face mounting wall. In addition, the major face mounting wall facing outward in the tool radial direction in the insert mounting seat abuts against the major face facing the major face mounting wall.

Therefore, when the cutting insert is viewed toward a side opposite to the tool rotation direction (when the long side face is viewed from the front in the direction of the insert long side face axial line), an angle (a second insert restriction angle, an angle indicated by the reference numeral θ2 in FIG. 15) formed between the short side face mounting wall and the major face mounting wall of the insert mounting seat can be set to be smaller than 90°. Therefore, a pulling force (force in an arrow direction indicated by the reference numeral F2 in FIG. 15) acting toward an apex side of the angle can be generated for the cutting insert restricted by the short side face mounting wall and the major face mounting wall of the insert mounting seat. In this manner, rattling (floating) of the cutting insert is suppressed during the tool rotating cutting process, and thus, mounting stability can be improved.

Then, the length of the flank face of the first minor cutting edge formed on the short side face of the cutting insert is shortened (that is, a "width" of the flank face) in the direction of the insert major face axial line, as the flank face extends from the first minor cutting edge in the direction of the insert long side face axial line. In this manner, according to the cutting insert as the embodiment of the present invention, it is possible to secure a large area of the flank face of the second minor cutting edge.

Specifically, as shown in FIGS. 8 and 18, in the first minor cutting edge and the second minor cutting edge located at both end edges in the direction of the insert long side face axial line on the short side face, the flank faces are arranged adjacent to each other. Therefore, as described above, if the flank face of the first minor cutting edge is formed so that the width is narrowed as the flank face extends from the first minor cutting edge in the direction of the insert long side face axial line, the flank face of the second minor cutting edge adjacent to the flank face of the first minor cutting edge is correspondingly widened as the flank face extends from the first minor cutting edge in the direction of the insert long side face axial line.

In this manner, the short side face mounting wall facing the tool distal end side in the insert mounting seat can be brought into contact with the flank face of the second minor cutting edge in a wide range. The cutting insert can be stably fixed to the insert mounting seat. Therefore, the above-described advantageous effect of improving the mounting stability of the cutting insert can be more remarkably obtained.

In addition, the flank faces of the pair of first minor cutting edges formed on the short side face are formed in mutually different planes. In this manner, the flank face of the first minor cutting edge can be relatively freely formed in various different ways so as to satisfy desired cutting performance.

Specifically, for example, the clearance angle of the first minor cutting edge when the cutting insert is viewed as a single body is set to the negative angle. In this manner, it is possible to secure a large tool angle of the first minor cutting edge. Alternatively, the clearance angle of the first minor cutting edge is set to the positive angle (right angle). In this manner, while the clearance angle of the first minor cutting edge is secured during the tool rotating cutting process, the rake angle is increased on the positive side, thereby enabling cutting quality to be improved. In a case where the clearance angle of the first minor cutting edge is set to the positive angle, it is preferable to dispose another plane (connecting face) connecting the flank faces to each other between the flank face of the first minor cutting edge and the flank face of the second minor cutting edge that are adjacent to each other in the direction of the insert long side face axial line on the short side face.

That is, according to the cutting insert as the embodiment of the present invention, the flank faces of the pair of first minor cutting edges formed on the short side face are formed in mutually different planes. Therefore, the flank faces of the first minor cutting edge are less likely to affect mutual arrangement, shape, or inclination. In this manner, it is possible to suppress the limitations on the tool angle or the clearance angle of the first minor cutting edge. Therefore, it is possible to remarkably improve the cutting performance such as defect resistance and operation accuracy of the edge tip.

As described above, according to the cutting insert and the indexable cutting tool using the cutting insert as the embodiment of the present invention, it is possible to perform not only the face milling operation or the shoulder milling operation, but also the ramping operation. In addition, according to the cutting insert and the indexable cutting tool using the cutting insert as the embodiment of the present invention, it is possible to improve the mounting stability of the cutting insert mounted to the insert mounting seat during the tool rotating cutting process, and thus, it is possible to improve the cutting performance.

In the cutting insert as the embodiment of the present invention, the clearance angle of the second minor cutting edge is set to the negative angle, or the flank face of the second minor cutting edge is inclined outward of the insert in the direction of the insert short side face axial line, as the flank face extends from the major face adjacent to the flank face in the direction of the insert major face axial line. In this manner, the following operation effect can be obtained.

That is, in the cutting insert mounted to the insert mounting seat of the tool main body, with respect to a rotation locus around the tool axial line of the major cutting edge used for the tool rotating cutting process, a corner portion (refer to FIG. 2) of the cutting insert located rearward in the tool rotation direction of the major cutting edge can be easily disposed inward in the tool radial direction from the rotation locus. Therefore, it is possible to stably improve accuracy in the tool rotating cutting process. The corner portion of the above-described cutting insert is located at an outer end portion (outer end portion in the tool radial direction) of the insert in the direction of the insert major face axial line, in the second minor cutting edge located on a side opposite to the tool rotation direction from the major cutting edge.

Specifically, according to the cutting insert of the vertical cutting edge double-sided type in the related art, it is difficult to secure second clearance of the major cutting edge. The cutting insert is less likely to secure the second clearance, especially when the diameter of the rotation locus of the major cutting edge further decreases (that is, when the diameter of the tool rotating cutting process becomes smaller).

On the other hand, according to the cutting insert as the embodiment of the present invention, as described above, with respect to the rotation locus of the major cutting edge, the corner portion of the cutting insert located rearward in the tool rotation direction of the major cutting edge back is likely to be disposed inward and rearward in the tool radial direction. Therefore, even in a case where the diameter of the tool rotating cutting process becomes smaller, the second clearance of the major cutting edge can be secured, and the tool rotating cutting process accuracy can be satisfactorily maintained. It is generally known that the end portion on the tool distal end side of the major cutting edge is likely to be affected by deflection caused by a cutting load. If a large amount of the second clearance is secured as in the embodiment according to the present invention, it is possible to reliably suppress damage to the tool even in a case where the deflection occurs, and thus, it is possible to prolong tool life.

In addition, in the cutting insert as the embodiment according to the present invention, it is preferable that the flank face of the second minor cutting edge formed on the short side face does not reach the first minor cutting edge located at an end edge on a side opposite to the second minor cutting edge in the direction of the insert long side face axial line, on the short side face.

In this case, it is possible to prevent the flank face of the second minor cutting edge from affecting a shape of the first minor cutting edge located at the end edge on the side opposite to the second minor cutting edge in the direction of the insert long side face axial line. In addition, at the same time, as described above, a large area of the flank face of the second minor cutting edge can be secured. For example, if the flank face of the second minor cutting edge is simply formed large, a possibility is conceivable that the flank face of the second minor cutting edge may reach the first minor cutting edge located at the end edge on the side opposite to the second minor cutting edge in the direction of the insert long side face axial line on the short side face and may affect a shape and a function of the first minor cutting edge. According to the above-described configuration as the embodiment of the present invention, this disadvantage can be prevented. Therefore, the first minor cutting edge can stably function as the flat cutting edge, for example, while the above-described operation effect can be remarkably obtained by the flank face of the second minor cutting edge.

In addition, in the cutting insert as the embodiment according to the present invention, it is preferable that the major face is inclined outward of the insert in the direction of the insert major face axial line, as the major face extends from the major cutting edge in the direction of the insert long side face axial line, in a directional view of the insert short side face axial line.

In this case, the flank face of the major cutting edge formed on the major face of the cutting insert is inclined outward of the insert in the direction of the insert major face axial line, as the flank face extends from the major cutting edge in the direction of the insert long side face axial line. Accordingly, the clearance angle of the major cutting edge when the cutting insert is viewed as a single body is set to the negative angle. Therefore, it is possible to secure a large tool angle of the major cutting edge.

That is, in the cutting insert of the vertical cutting edge type as the embodiment according to the present invention, a heavy tool rotating cutting process (highly efficient operation) is generally required. In the cutting insert of the vertical cutting edge type, strong cutting resistance acts particularly on the major cutting edge due to high level cutting and high level feeding, and high rigidity that can withstand this cutting resistance is required. Therefore, if the large tool angle of the major cutting edge is secured as described above, the edge tip strength can be sufficiently improved, and the cutting edge defect can be suppressed. Therefore, the tool rotating cutting process (particularly, the heavy tool rotating cutting process) can be stably performed.

In addition, in the cutting insert as the embodiment according to the present invention, it is preferable that a length in the direction of the insert major face axial line on the flank face of the second minor cutting edge increases in a portion adjacent to the second minor cutting edge, compared to an end portion of the flank face that is located on a side opposite to the second minor cutting edge in the direction of the insert long side face axial line.

In this case, the above-described operation effect according to the embodiment of the present invention is more remarkably obtained in that the mounting stability can be improved by causing the short side face mounting wall and the long side face mounting wall of the insert mounting seat to restrict the cutting insert. That is, the short side face mounting wall of the insert mounting seat can be brought into contact with the flank face of the second minor cutting edge at a position away from the long side face mounting wall, on the short side face mounting wall, in a wide range. In this manner, it is possible to remarkably increase a restriction force of the cutting insert by using the short side face mounting wall and the long side face mounting wall, and thus, it is possible to reliably suppress the rattling of the cutting insert.

In addition, in the cutting insert as an embodiment according to the present invention, it is preferable that the flank faces of the pair of first minor cutting edges extending from the pair of first minor cutting edges located at both end edges in the direction of the insert long side face axial line of the short side face toward mutually opposite sides along the direction of the insert long side face axial line are connected to each other.

In addition, in the cutting insert as the embodiment according to the present invention, it is preferable that the flank faces of the pair of second minor cutting edges extending from the pair of second minor cutting edges located at both end edges in the direction of the insert long side face axial line of the short side face toward mutually opposite sides along the insert long side face axial line are arranged to be adjacent to each other in the direction of the insert major face axial line.

In this case, the flank faces of the pair of second minor cutting edges formed on the short side face of the cutting insert are arranged adjacent to each other in the direction of the insert major face axial line. That is, the flank faces of the pair of second minor cutting edges are directly connected and adjacent to each other without interposing other faces between the flank faces. For example, the flank face of the first minor cutting edge (flat cutting edge) is not interposed between the flank faces. Therefore, according to the above-described configuration, the larger area of the flank face of the second minor cutting edge can be secured. In this manner, the short side face mounting wall facing the tool distal end side in the insert mounting seat can be brought into contact with the flank face of the second minor cutting edge in a wide range. The above-described advantageous effect can be more remarkably obtained in that the mounting stability of the cutting insert is improved.

In addition, in the cutting insert as the embodiment according to the present invention, a configuration may be adopted as follows. A mounting hole penetrating in one direction is disposed, a fixing member having a shaft portion and a locking portion located at one end of the shaft portion is inserted into the mounting hole, and is fixed to the tool main body rotating around a tool axial line. A tapered portion that decreases a diameter of the mounting hole along an inserting direction of the fixing member is disposed in the mounting hole. The tapered portion at least partially has a polishing portion in a portion in contact with the locking portion of the fixing member.

In the cutting insert, stress generated by being fastened to a portion (contact portion) in contact with the fixing member is applied to the cutting insert. Therefore, the cutting insert is likely to be cracked starting from a defect on the surface of the contact portion. According to the above-described configuration, in the cutting insert, the contact portion is at least partially provided with the polishing portion, thereby removing the defect serving as the crack starting point. In this manner, damage to the cutting insert can be suppressed. In addition, the cutting insert has the tapered portion in the mounting hole, and comes into contact with the locking portion of the fixing member in the tapered portion. In this manner, it is easy to relatively align the center axis of the mounting hole and the center axis of the fixing member with each other.

In addition, in the cutting insert as the embodiment according to the present invention, a configuration may be adopted as follows. The mounting hole is disposed by penetrating the pair of major faces. A rake face is disposed on the side face connecting peripheral edges of the pair of major faces to each other.

In this case, a load is likely to be applied to the fixing member that fixes the cutting insert. Thus, it is necessary to increase the diameter of the fixing member, and a thin portion is likely to be formed in the cutting insert. According to the above-described cutting insert, the crack starting point is unlikely to appear in the contact portion with the fixing member. Accordingly, damage can be suppressed even in a case of the cutting insert having the thinned portion formed therein.

In addition, in the cutting insert as the embodiment according to the present invention, a configuration may be adopted as follows. The mounting hole has a smaller-diameter portion located at an end portion on a side where a hole diameter of the tapered portion is small. The tapered portion has a curved portion smoothly connected to the smaller-diameter portion, and comes into contact with the locking portion of the fixing member in the curved portion.

According to the above-described cutting insert, when being fastened to the fixing member, the posture of the cutting insert can be easily adjusted by coming into contact with the locking portion of the fixing member in the curved portion.

In addition, in the cutting insert as the embodiment according to the present invention, it is preferable that arithmetic average roughness Ra of the polishing portion is equal to or smaller than 0.35 μm.

According to the above-described cutting insert, it is possible to more reliably suppress the crack.

In addition, in the cutting insert as the embodiment according to the present invention, a configuration may be adopted as follows. The mounting hole is disposed by penetrating the pair of major faces. The mounting hole is provided with a pair of the tapered portions whose diameter decreases inward from each of the major faces.

The cutting insert having the above-described configuration can be mounted to the tool main body in a reversible manner.

Advantageous Effects of Invention

According to the cutting insert and the indexable cutting tool of the present invention, it is possible to perform not only the face milling operation or the shoulder milling operation, but also the ramping operation. In addition, according to the cutting insert and the indexable cutting tool of the present invention, the mounting stability of the cutting insert mounted to the insert mounting seat during the tool rotating cutting process can be improved, and the cutting performance can be improved.

DESCRIPTION OF EMBODIMENTS

<First Embodiment>

Figure 1:
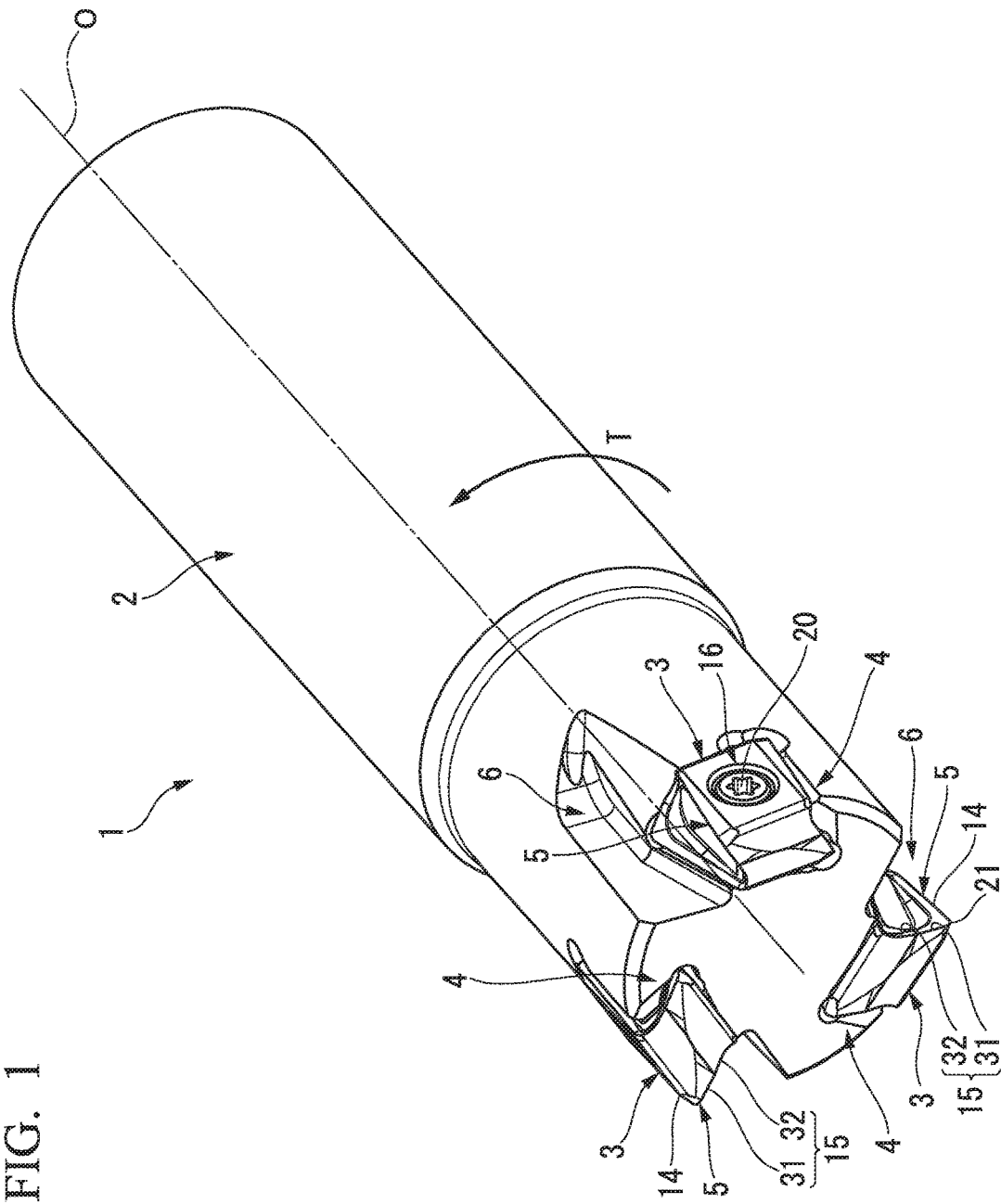
FIG. 1 is a perspective view showing an indexable cutting tool according to a first embodiment.
Figure 2:
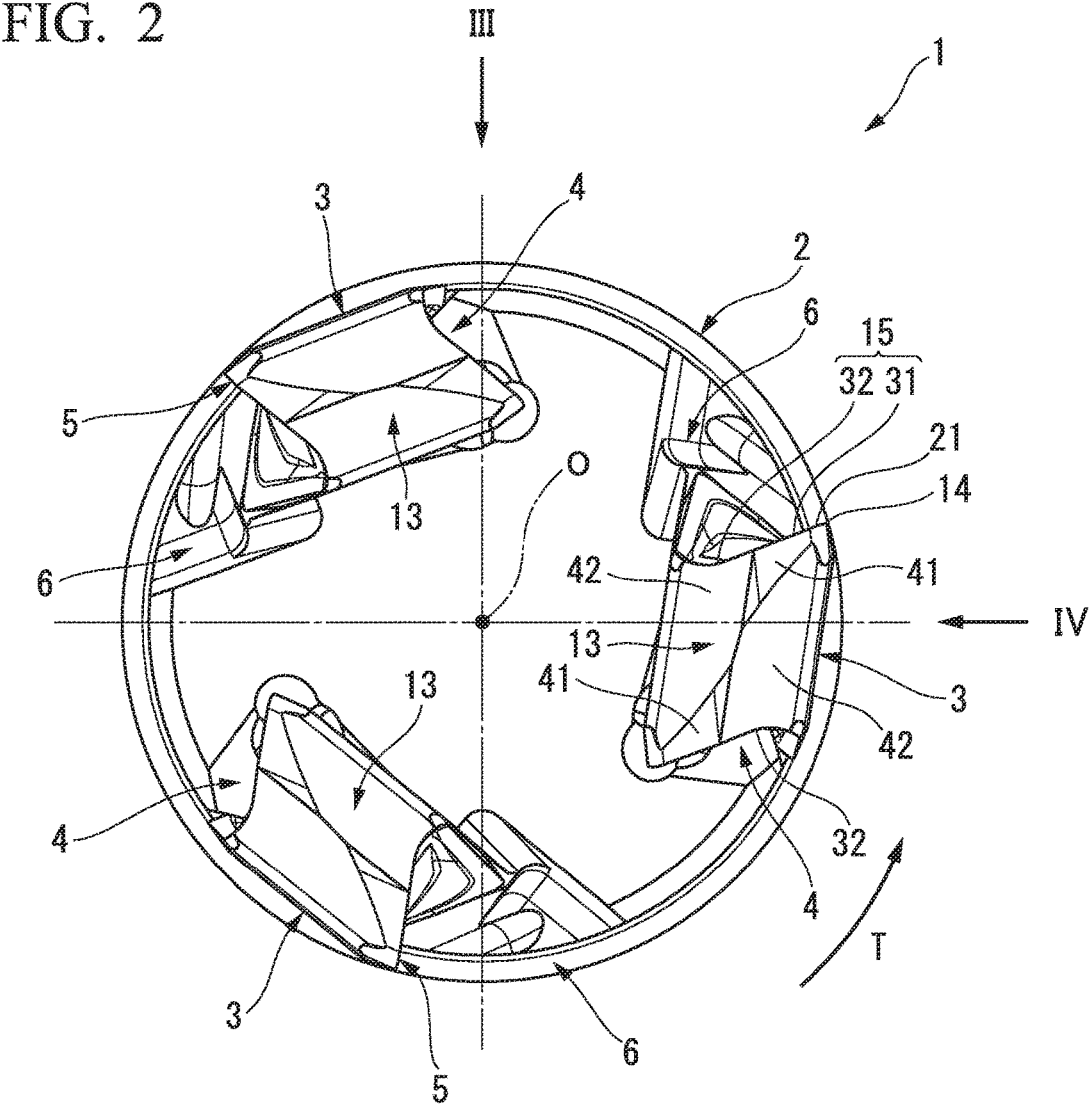
FIG. 2 is a front view when the indexable cutting tool is viewed from a distal end toward a posterior side in a direction of a tool axial line.

Hereinafter, an indexable cutting tool 1 and a cutting insert 3 according to a first embodiment will be described with reference to FIGS. 1 to 16.

[Schematic Configuration of Indexable Cutting Tool]

As shown in FIGS. 1 to 4, the indexable cutting tool 1 according to the present embodiment includes a tool main body 2 formed of steel, and the cutting insert 3 formed of a hard material such as a cemented carbide alloy. A recessed insert mounting seat 4 is formed in a tip outer peripheral portion of the tool main body 2 rotated around a tool axial line O. The cutting insert 3 having a cutting edge 5 is detachably mounted to the insert mounting seat 4.

As shown in FIGS. 5 to 8, the cutting insert 3 is a so-called vertical cutting edge double-sided type. The cutting insert 3 has a rectangular plate shape, and is formed in a reversibly symmetrical shape. The cutting insert 3 includes a pair of major faces 11 serving as front and rear faces, and a side face 10 connecting peripheral edges of the pair of major faces 11 to each other. The side face 10 has four faces arrayed in a circumferential direction on an outer periphery of the cutting insert 3. The side face 10 includes a pair of long side faces 12 arranged to mutually face backward (arranged back to back), and a pair of short side faces 13 arranged to mutually face backward and connecting the pair of long side faces 12 to each other. The long side face 12 is connected to a long side out of four sides (a pair of long sides and a pair of short sides) forming a peripheral edge of the rectangular major face 11. The short side face 13 is connected to a short side out of the four sides forming the peripheral edge of the major face 11. The long side face 12 and the short side face 13 are respectively formed in a rectangular shape.

In addition, as the cutting edge 5, the cutting insert 3 has at least a major cutting edge 14, a minor cutting edge 15, and a corner cutting edge 21. The major cutting edge 14 is formed in an intersection ridge portion between the major face 11 and the long side face 12. The minor cutting edge 15 is formed in an intersection ridge portion between the long side face 12 and the short side face 13. The corner cutting edge 21 is located at a corner portion (corner) of the long side face 12, and connects the major cutting edge 14 and the minor cutting edge 15 to each other. That is, the cutting edge 5 is formed in a substantially L-shape while extending so that the major cutting edge 14 and the minor cutting edge 15 are substantially orthogonal to each other. The cutting insert 3 according to the present embodiment has total four (4 sets) cutting edges 5 having the L-shape in this way.

A detailed configuration of the cutting insert 3 will be separately described later.

In FIGS. 1 to 4, the cutting insert 3 is mounted to the insert mounting seat 4 of the tool main body 2. The cutting edge 5 of the cutting insert 3 is disposed on the distal end side of the tool main body 2 so as to protrude outward in a radial direction.

In the indexable cutting tool 1, a posterior portion (shank portion) of the tool main body 2 is mounted to a main spindle (not shown) of a machine tool, and is rotated to follow a tool rotation direction T around the tool axial line O. In this manner, the indexable cutting tool 1 performs a tool rotating cutting process (milling process) on a work material such as a metallic material by using the cutting edge 5 of the cutting insert 3. For example, the indexable cutting tool 1 is an indexable insert milling cutter.

The indexable cutting tool 1 can perform not only a face milling operation or a shoulder milling operation on the work material, but also a pocket hole digging operation (deep digging operation) using the ramping operation, for example.

[Definition of Orientation (Direction) Used Herein]

In the description herein, in FIGS. 1 to 4 and 13 to 16, a direction from the shank portion toward the insert mounting seat 4 in a direction along the tool axial line O (direction of the tool axial line O) of the tool main body 2 is referred to as a tool distal end side (lower side in FIGS. 3, 4, 15 and 16). The direction from the insert mounting seat 4 toward the shank portion in the direction along the tool axial line O (direction of the tool axial line O) of the tool main body 2 is referred to as a tool posterior side (upper side in FIGS. 3, 4, 15, and 16).

In addition, a direction orthogonal to the tool axial line O is referred to as a tool radial direction. In the tool radial direction, a direction closer to the tool axial line O is referred to as inward in the tool radial direction. In the tool radial direction, a direction away from the tool axial line O is referred to as outward in the tool radial direction. In addition, a direction of turning around the tool axial line O is referred to as a tool circumferential direction. An orientation in which the tool main body 2 is rotated by the main spindle of the machine tool during the tool rotating cutting process in the tool circumferential direction is referred to as a tool rotation direction T. An opposite rotation direction of the tool rotation direction T in the tool circumferential direction is referred to as a side opposite to the tool rotation direction T (counter-tool rotation direction).

In addition, in the cutting insert 3 shown in FIGS. 5 to 12, an imaginary straight line passing through each center of the pair of the major faces 11 is referred to as an insert major face axial line C1. In the cutting insert 3, an imaginary straight line passing through each center of the pair of long side faces 12 is referred to as an insert long side face axial line C2. In the cutting insert 3, an imaginary straight line passing through each center of the pair of short side faces 13 is referred to as an insert short side face axial line C3.

That is, the insert major face axial line C1 extends through the center of one major face 11 of the pair of major faces 11 and the center of the other major face 11. The insert long side face axial line C2 extends through the center of one long side faces 12 of the pair of long side faces 12 and the center of the other long side face 12. The insert short side face axial line C3 extends through the center of one short side face 13 of the pair of short side faces 13 and the center of the other short side face 13. Each of the insert axial lines C1 to C3 perpendicularly intersect each other at the center (center point) of the cutting insert 3.

Figure 6:
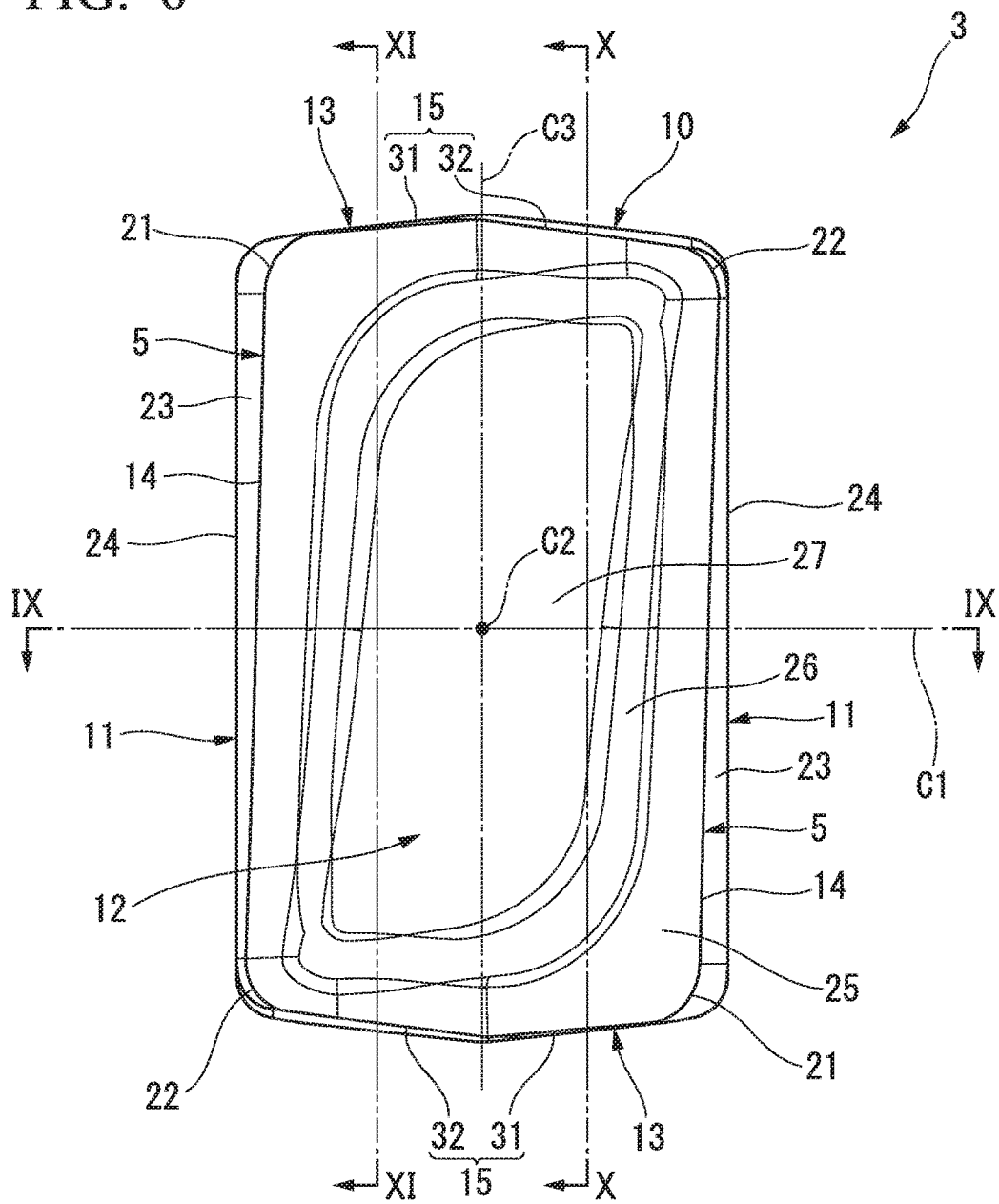
FIG. 6 is a view when the cutting insert is viewed in a direction of an insert long side face axial line (view when a long side face is viewed from the front).
Figure 8:
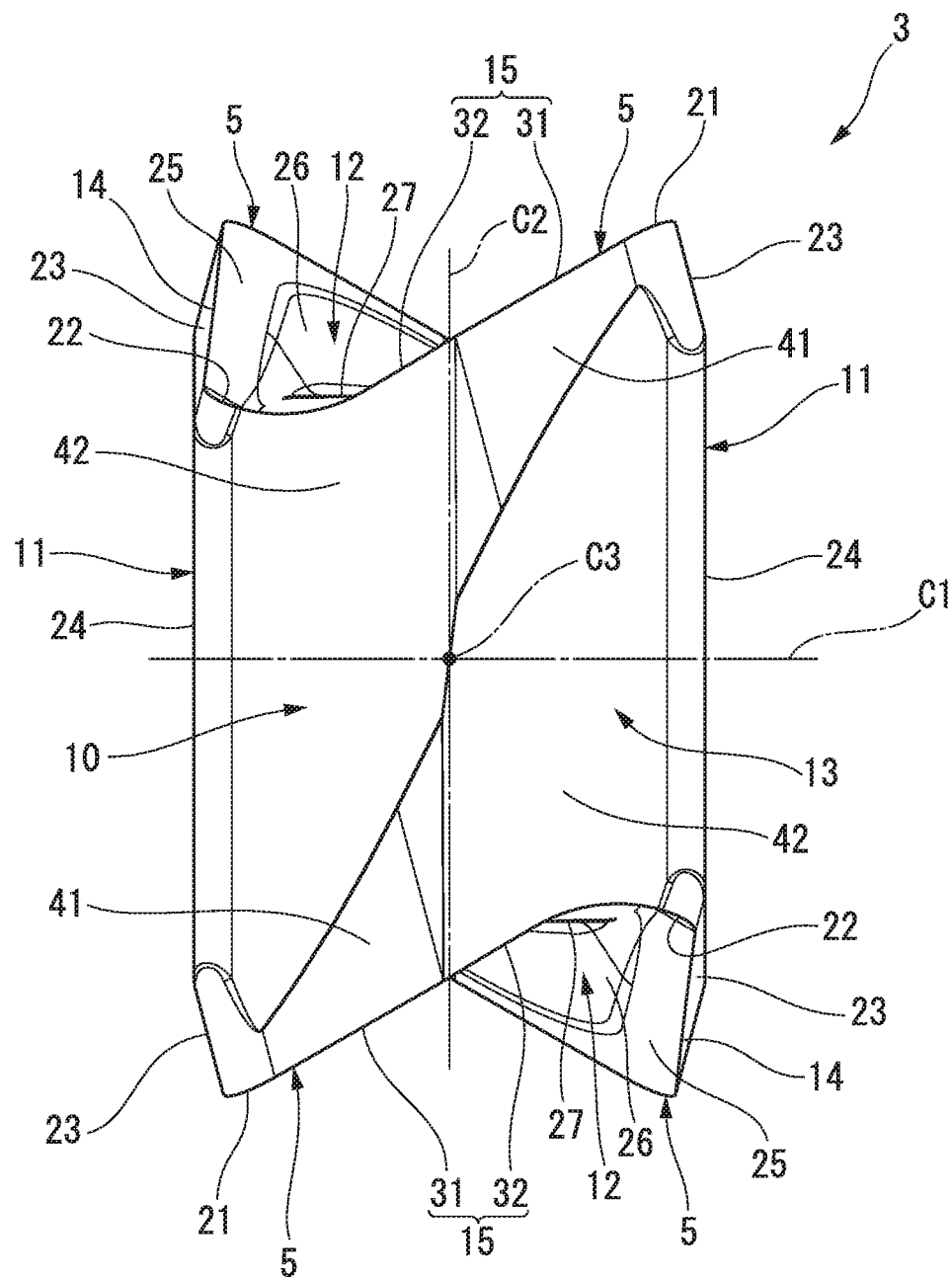
FIG. 8 is a view when the cutting insert is viewed in a direction of an insert short side face axial line (view when a short side face is viewed from the front).

In addition, an orientation in which the insert major face axial line C1 extends (direction along the insert major face axial line C1) is referred to as a direction of the insert major face axial line C1. In a side view of the cutting insert 3 shown in FIGS. 6 and 8, in the direction of the insert major face axial line C1, a direction from each of the major faces 11 toward the center (intersection of the insert axial lines C1 to C3) of the cutting insert 3 is referred to as inward of the insert in the direction of the insert major face axial line C1. On the other hand, in the direction of the insert major face axial line C1, a direction from the center of the cutting insert 3 toward each of the major faces 11 is referred to as outward of the insert in the direction of the insert major face axial line C1. A side view of the cutting insert 3 shown in FIG. 6 is a side view when the long side face 12 is viewed from the front. In addition, the side view of the cutting insert 3 shown in FIG. 8 is a side view when the short side face 13 is viewed from the front.

In addition, an orientation in which the insert long side face axial line C2 extends (direction along the insert long side face axial line C2) is referred to as a direction of the insert long side face axial line C2. In a plan view of the cutting insert 3 shown in FIG. 7 and in a side view of the cutting insert 3 shown in FIG. 8, in the direction of the insert long side face axial line C2, a direction from each of the long side faces 12 toward the center of the cutting insert 3 is referred to as inward of the insert in the direction of the insert long side face axial line C2. On the other hand, in the direction of the insert long side face axial line C2, the direction from the center of the cutting insert 3 toward each of the long side faces 12 is referred to as outward of the insert in the direction of the insert long side face axial line C2. A plan view of the cutting insert 3 shown in FIG. 7 is a plan view when the major face 11 is viewed from the front.

In addition, an orientation in which the insert short side face axial line C3 extends (direction along the insert short side face axial line C3) is referred to as a direction of the insert short side face axial line C3. In a side view of the cutting insert 3 shown in FIG. 6 and in a plan view of the cutting insert 3 shown in FIG. 7, in the direction of the insert short side face axial line C3, a direction from each of the short side faces 13 toward the center of the cutting insert 3 is referred to as inward of the insert in the direction of the insert short side face axial line C3. On the other hand, in the direction of the insert short side face axial line C3, a direction from the center of the cutting insert 3 toward each of the short side faces 13 is referred to as outward of the insert in the direction of the insert short side face axial line C3.

Figure 7:
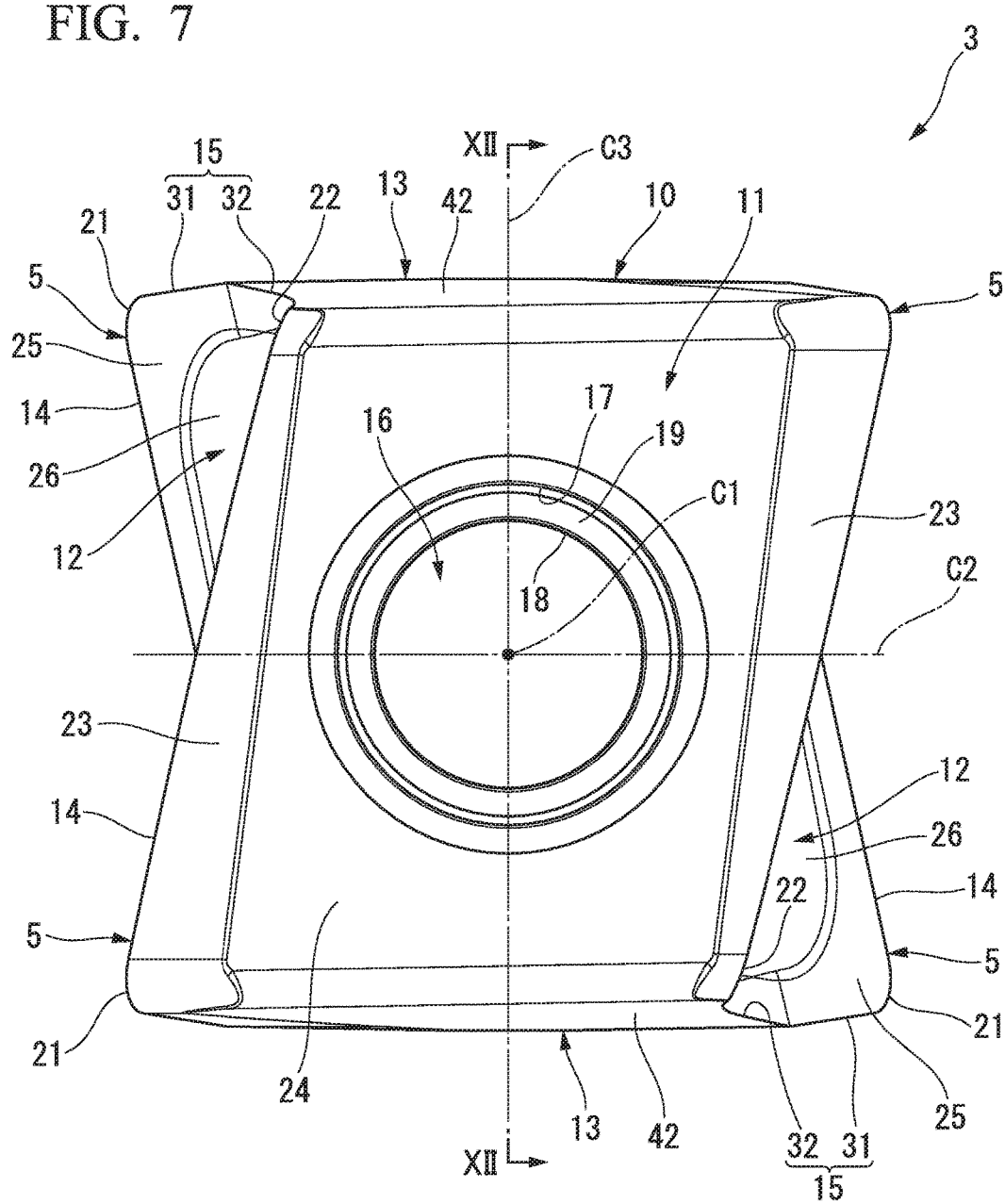
FIG. 7 is a view when the cutting insert is viewed in a direction of an insert major face axial line (view when a major face is viewed from the front).
Figure 10:
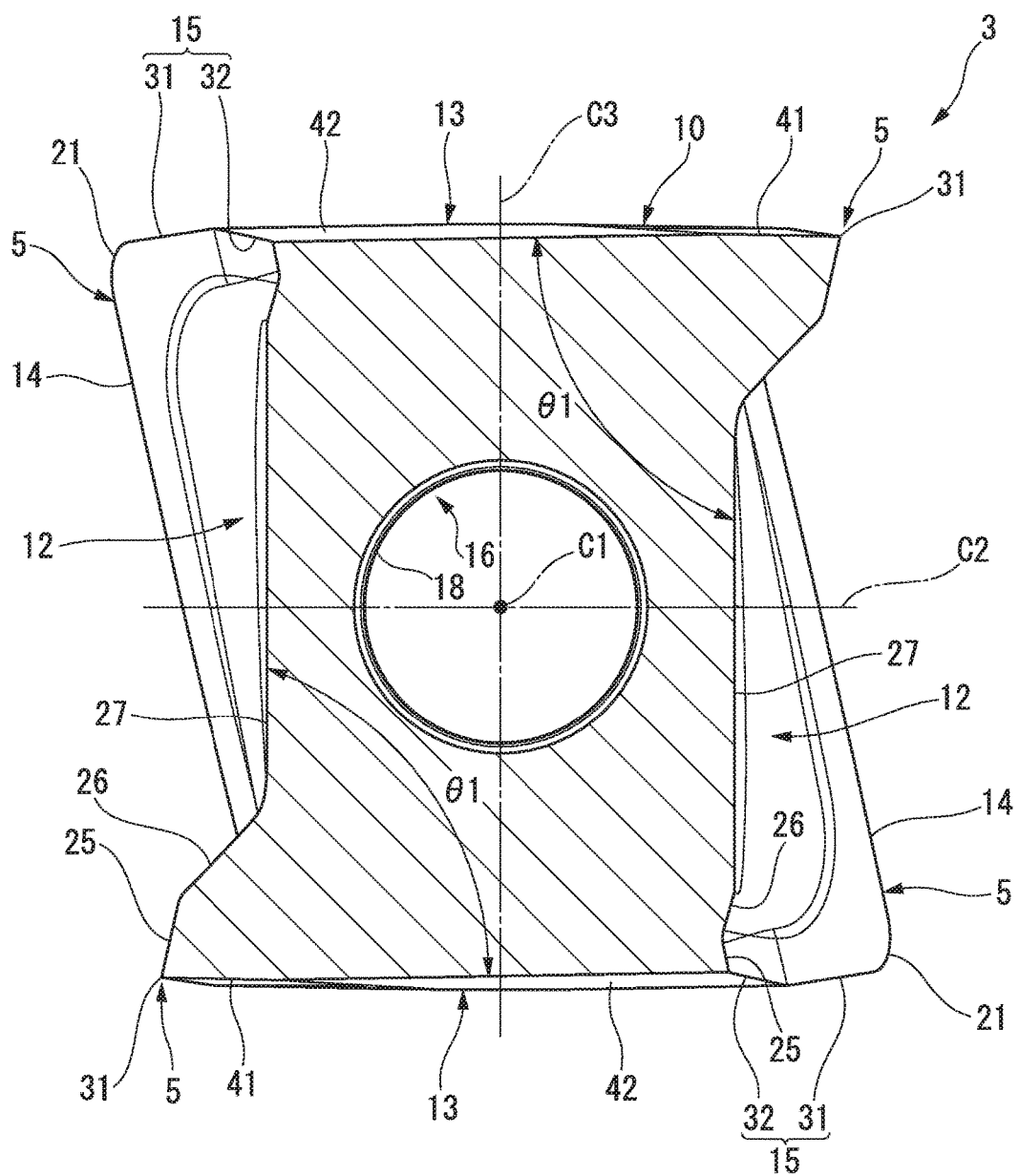
FIG. 10 is a view showing a cross section taken along line X-X in FIG. 6.
Figure 11:
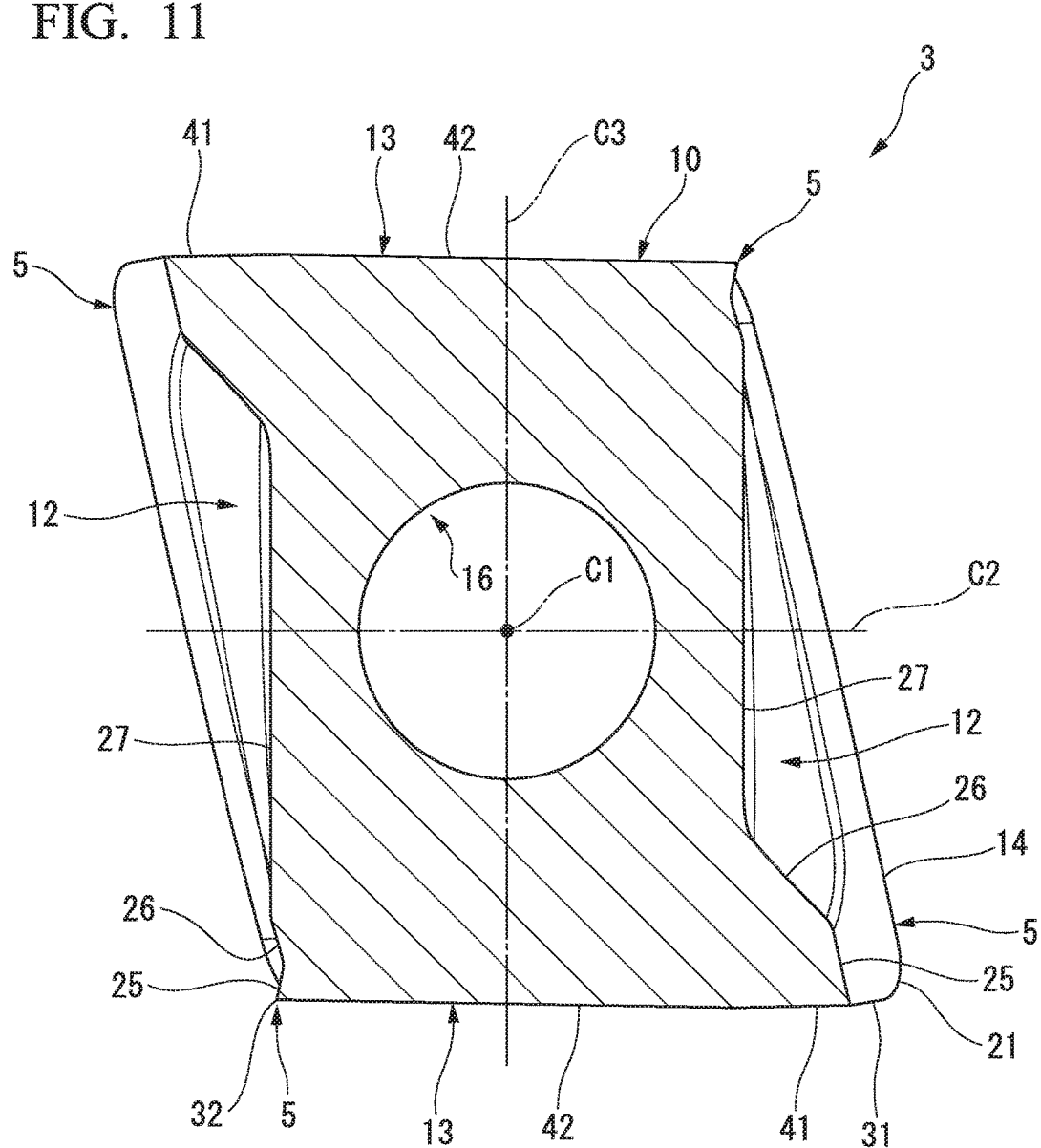
FIG. 11 is a view showing a cross section taken along line XI-XI in FIG. 6.

In addition, in the description herein, as shown in FIG. 7, a plan view when the major face 11 is viewed along the insert major face axial line C1 from the front is referred to as a directional view of the insert major face axial line C1. In addition, as shown in FIGS. 10 and 11, a plane sectional view perpendicular to the insert major face axial line C1 is referred to as a directional view of the insert major face axial line C1.

Figure 12:
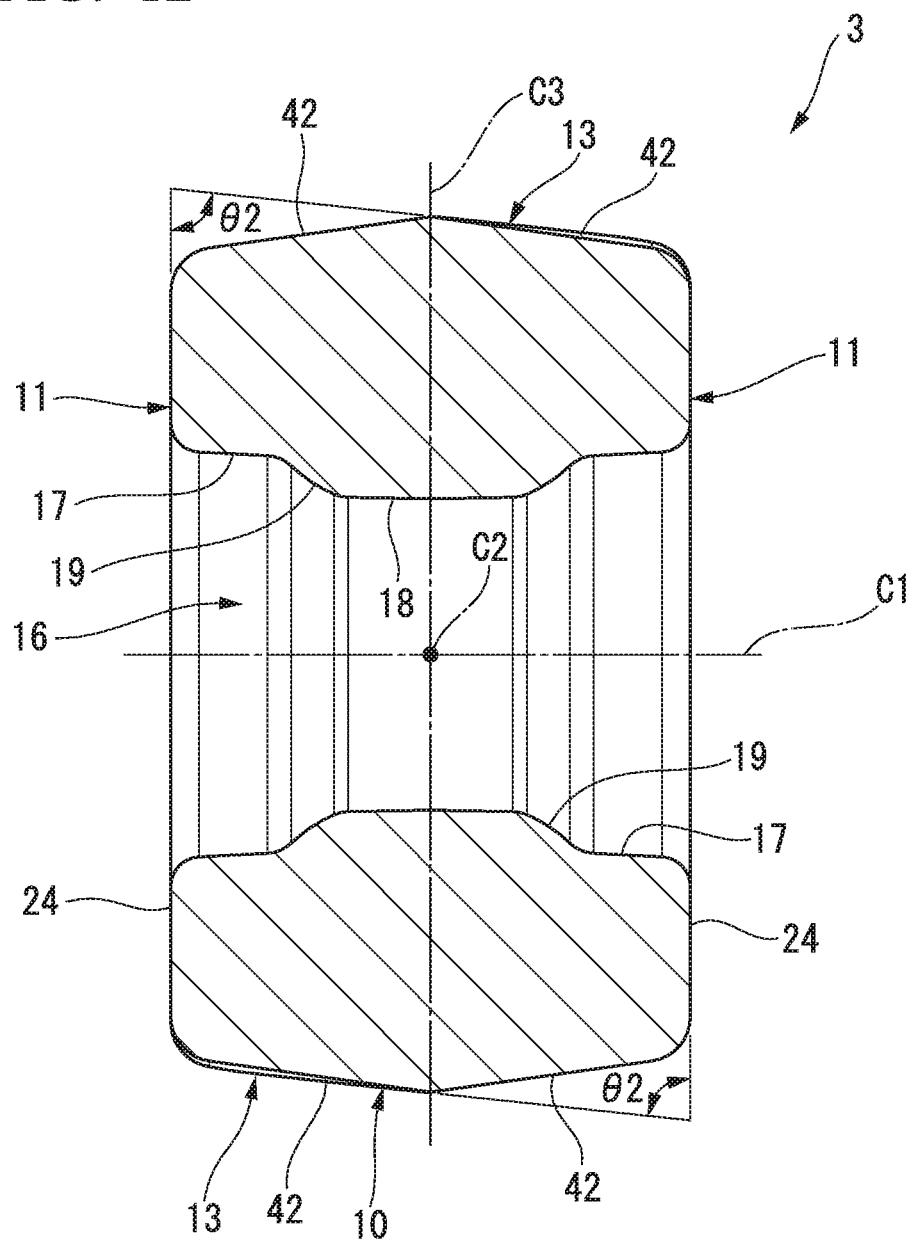
FIG. 12 is a view showing a cross section taken along line XII-XII in FIG. 7.
Figure 13:
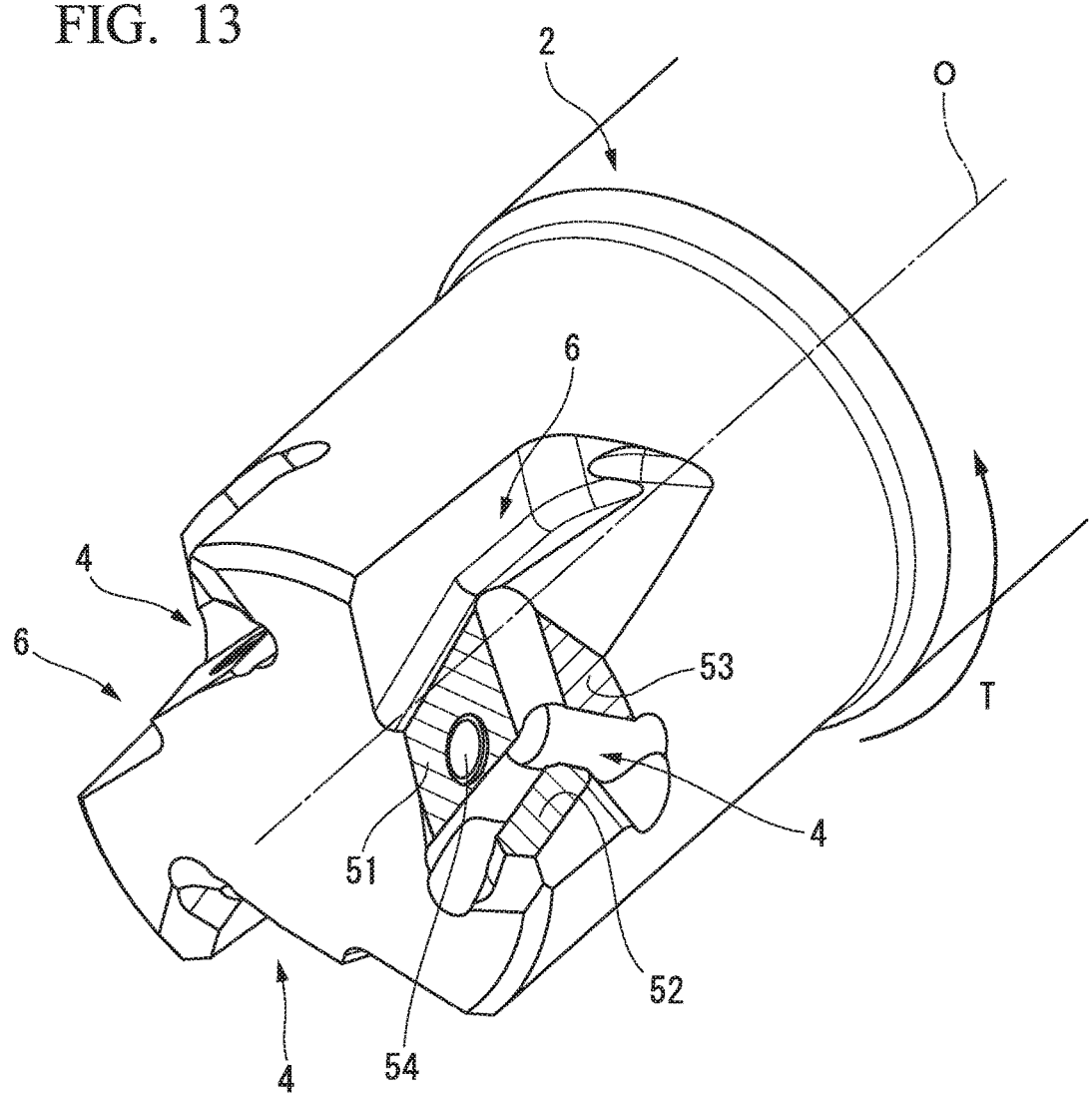
FIG. 13 is a perspective view showing a tool main body.

In addition, as shown in FIG. 6, a side view when the long side face 12 is viewed along the insert long side face axial line C2 from the front is referred to as a directional view of the insert long side face axial line C2. In addition, as shown in FIG. 12, a side sectional view perpendicular to the insert long side face axial line C2 is referred to as a directional view of the insert long side face axial line C2.

Figure 9:
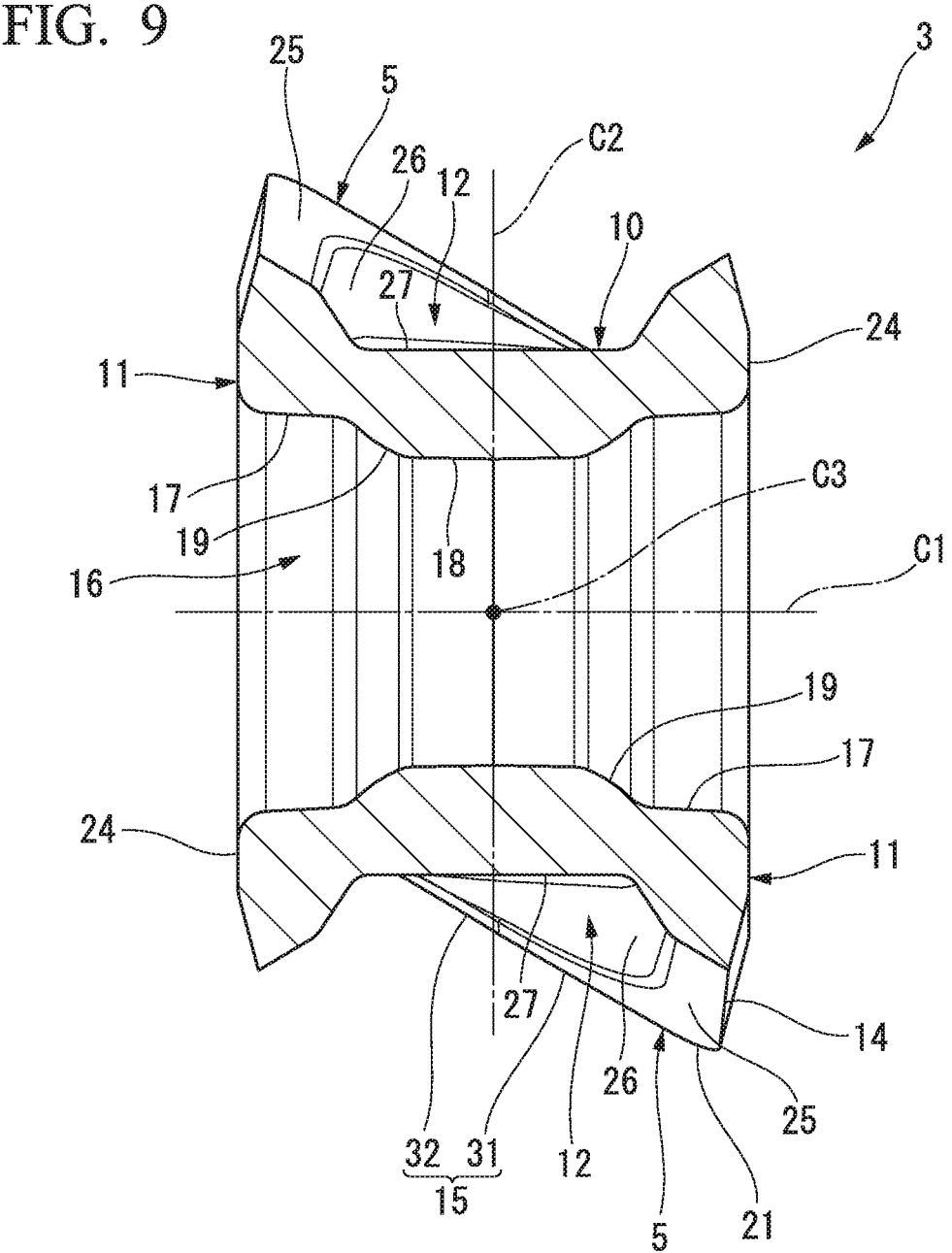
FIG. 9 is a view showing a cross section taken along line IX-IX in FIG. 6.

In addition, as shown in FIG. 8, a side view when the short side face 13 is viewed along the insert short side face axial line C3 from the front is referred to as a directional view of the insert short side face axial line C3. In addition, as shown in FIG. 9, a side sectional view perpendicular to the insert short side face axial line C3 is referred to as a directional view of the insert short side face axial line C3.

[Tool Main Body]

In FIGS. 1 to 4 and FIGS. 13 to 16, the tool main body 2 has a cylindrical shape or a disk shape. The tool main body 2 is rotated around the tool axial line O serving as a central axis thereof by the main spindle of the machine tool.

In an example according to the present embodiment, the tool main body 2 has a cylindrical shape. In addition, compared to the tip portion (cutting edge portion) of the tool main body 2, a portion (shank portion) other than the tip portion is formed to have a larger diameter.

In the tip outer peripheral portion of the tool main body 2, a plurality of chip pockets 6 are formed so as to be cut out in a recessed shape from the tip outer peripheral portion at an interval therebetween in the tool circumferential direction.

In the chip pockets 6, the insert mounting seats 4 to which the cutting insert 3 is detachably mounted are respectively disposed in a portion located on the side opposite to the tool rotation direction T. The insert mounting seat 4 has a rectangular hole shape corresponding to a shape of the cutting insert 3.

A configuration of the insert mounting seat 4 will be separately described in detail after a detailed configuration of the cutting insert 3 is described.

Although not specifically shown, a coolant hole for ejecting coolant (oil-based or water-soluble cutting fluid) may be open in the chip pocket 6. In this case, the coolant hole ejects the coolant (oil-based or water-soluble cutting fluid) toward the vicinity of the cutting edge 5 of the cutting insert 3 mounted to the insert mounting seat 4. The coolant hole is connected to coolant supply means (not shown) through the main spindle of the machine tool mounted to the shank portion of the tool main body 2 in the posterior portion. The coolant hole is open to the chip pocket 6 in the tip portion.

[Cutting Insert]

As shown in FIGS. 5 to 12, the cutting insert 3 is formed in a rotationally symmetric shape of 180° around the insert major face axial line C1 passing through each center of the pair of major faces 11. The cutting insert 3 is formed in a rotationally symmetrical shape of 180° around the insert long side face axial line C2 passing through each center of the pair of long side faces 12. In addition, the cutting insert 3 is formed in rotationally symmetric shape of 180° around the insert short side face axial line C3 passing through each center of the pair of short side faces 13.

A distance between the pair of major faces 11 is shorter than a distance between the pair of long side faces 12 and a distance between the pair of short side faces 13. In addition, the distance between the pair of long side faces 12 is shorter than the distance between the pair of short side faces 13. Therefore, the cutting insert 3 has a rectangular plate shape in which the direction of the insert major face axial line C1 serves as a thickness direction (plate thickness direction).

[Mounting Hole]

In the cutting insert 3, the mounting hole 16 penetrates the cutting insert 3 in the direction of the insert major face axial line C1, thereby forming the mounting hole 16 that is open to the pair of major faces 11. As shown in FIGS. 9 and 12, the mounting hole 16 has a pair of larger-diameter portions 17, a smaller-diameter portion 18, and tapered portions 19. The larger-diameter portion 17 is open to the major face 11. The smaller-diameter portion 18 is located inward of the insert in the direction of the insert major face axial line C1 from the pair of larger-diameter portion 17. The tapered portions 19 are respectively arranged between the pair of larger-diameter portions 17 and the smaller-diameter portion 18, and connect all of these to each other. The tapered portion 19 gradually decreases in diameter as the tapered portion 19 extends inward of the insert in the direction of the insert major face axial line C1 from a portion connected to the larger-diameter portion 17, and is smoothly connected to the smaller-diameter portion 18.

Figure 3:
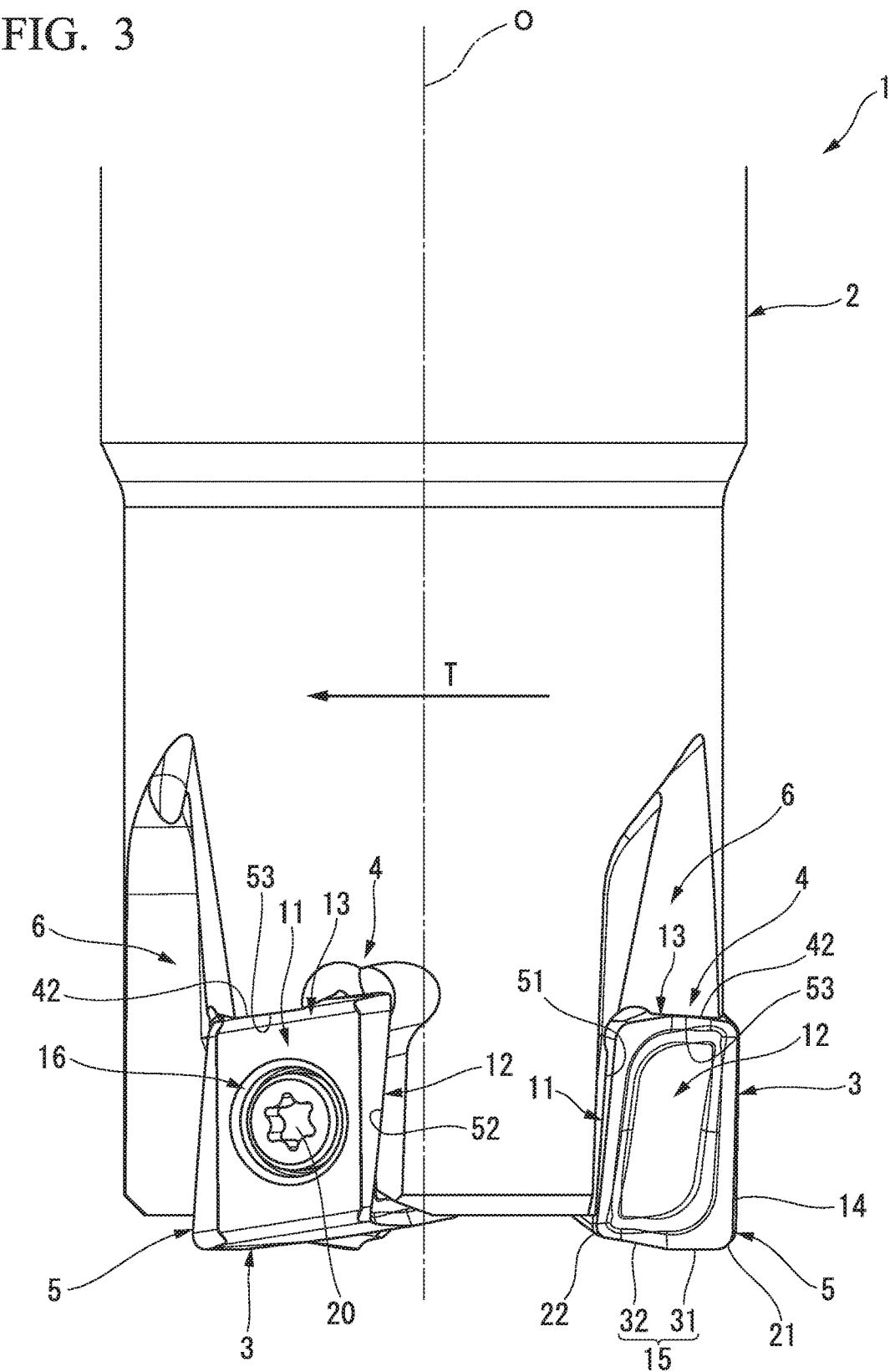
FIG. 3 is a side view when the indexable cutting tool is viewed in a direction III in FIG. 2.
Figure 4:
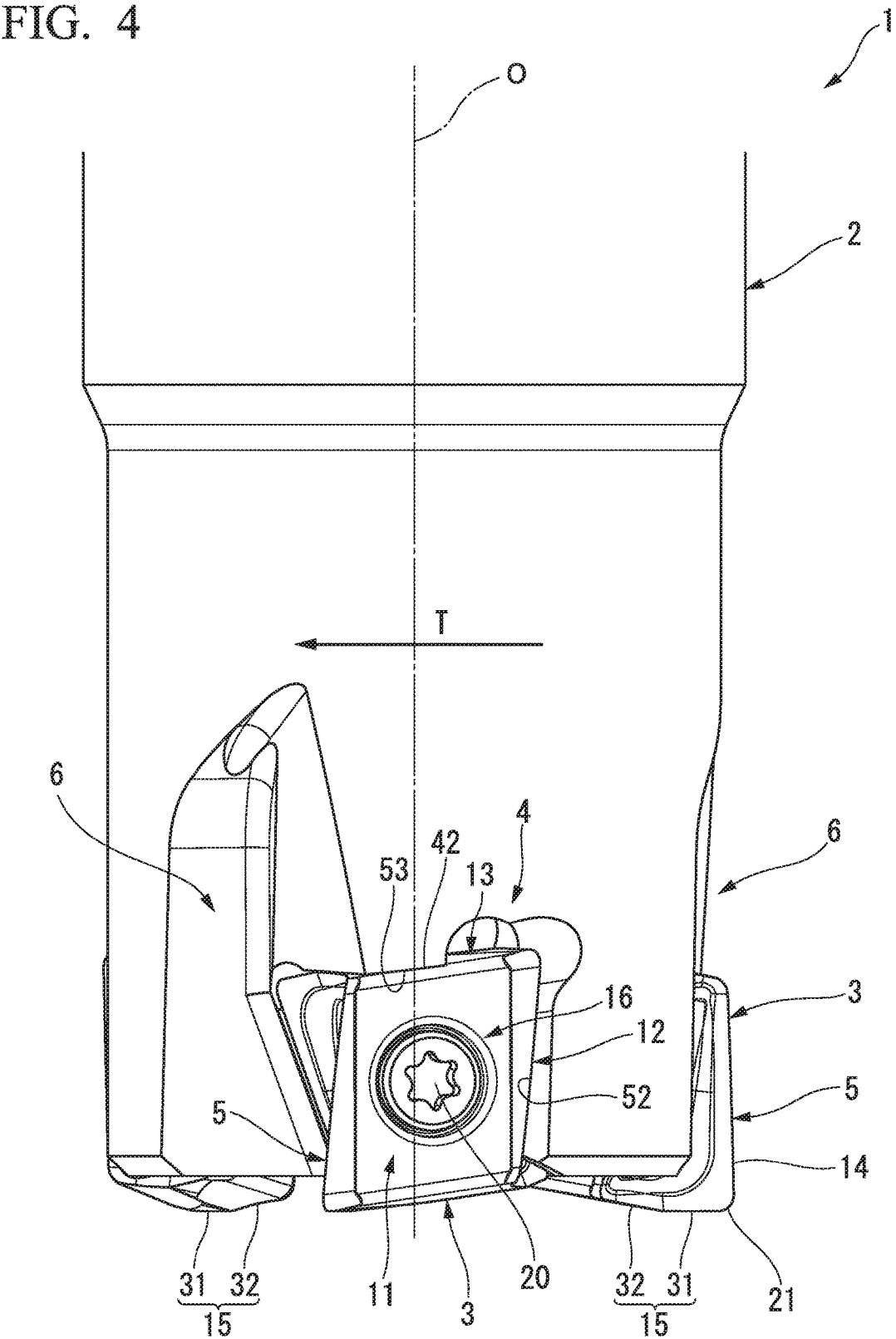
FIG. 4 is a side view when the indexable cutting tool is viewed in a direction IV in FIG. 2.

As shown in FIGS. 1, 3, and 4, a clamp screw (fixing member) 20 is inserted into the mounting hole 16 of the cutting insert 3. Although not specifically shown, a screw shaft portion between the screw shaft portion and a head portion that belong to the clamp screw 20 is screwed to a screw hole 54 (refer to FIG. 13) of the insert mounting seat 4 after passing through the inside of the mounting hole 16. In addition, the head portion of the clamp screw 20 is locked by the tapered portion 19 so as to be accommodated in the larger-diameter portion 17 of the mounting hole 16.

[Cutting Edge]

As shown in FIGS. 5 to 8, as the cutting edge 5, the cutting insert 3 includes the major cutting edge 14, the minor cutting edge 15, and the corner cutting edge 21 connecting both of these to each other. In addition, the cutting insert 3 according to the present embodiment has a connection cutting edge 22 connecting the pair of cutting edges 5 adjacent to each other in the peripheral edge of the long side face 12. The length of the major cutting edge 14 is longer than the length of the minor cutting edge 15, the length of the corner cutting edge 21, and the length of the connection cutting edge 22. The connection cutting edge 22 may not be disposed therein, since the connection cutting edge 22 is a visual portion of the cutting edge 5, which is not used for the tool rotating cutting process.

The major cutting edge 14 has a linear shape. The major cutting edge 14 is located on a long side among four sides (a pair of long sides and a pair of short sides) forming a peripheral edge of the long side face 12. As shown in FIG. 7, in the major cutting edge 14, an end portion connected to the corner cutting edge 21 is disposed most outward of the insert in the direction of the insert long side face axial line C2. The major cutting edge 14 extends so as to be gradually inclined inward of the insert in the direction of the insert long side face axial line C2, as the major cutting edge 14 extends from the corner cutting edge 21 in the direction of the insert short side face axial line C3.

In addition, as shown in FIG. 6, in the major cutting edge 14, an end portion connected to the corner cutting edge 21 is disposed most inward of the insert in the direction of the insert major face axial line C1. The major cutting edge 14 extends so as to be gradually inclined outward of the insert in the direction of the insert major face axial line C1, as the major cutting edge 14 extends from the corner cutting edge 21 in the direction of the insert short side face axial line C3.

The minor cutting edge 15 is located on a short side among the four sides (the pair of long sides and the pair of short sides) forming the peripheral edge of the long side face 12. The minor cutting edge 15 has a first minor cutting edge 31 and a second minor cutting edge 32. The first minor cutting edge 31 is connected to the major cutting edge 14 via the corner cutting edge 21. The second minor cutting edge 32 is connected to an end portion of the first minor cutting edge 31 on a side opposite to the major cutting edge 14. As shown in FIG. 6, the second minor cutting edge 32 extends so as to be inclined inward of the insert in the direction of the insert short side face axial line C3, as the second minor cutting edge 32 extends from the end portion of the first minor cutting edge 31 in the direction of the insert major face axial line C1, in a directional view of the insert long side face axial line C2.

In the present embodiment, the first minor cutting edge 31 of the minor cutting edge 15 is used as a cutting edge (flat cutting edge) for a finish operation. In addition, the second minor cutting edge 32 is used as a cutting edge (ramping cutting edge) for a ramping operation. Specifically, when this cutting insert 3 is mounted to the insert mounting seat 4 of the tool main body 2, the first minor cutting edge 31 is disposed so as extend into an imaginary plane perpendicular to the tool axial line O. In addition, the second minor cutting edge 32 is disposed so as to extend so as to be inclined toward the tool posterior side, as the second minor cutting edge 32 extends inward in the tool radial direction from a portion connected to the first minor cutting edge 31.

The first minor cutting edge 31 has a linear shape. In a directional view of the insert long side face axial line C2 shown in FIG. 6, in the first minor cutting edge 31, an end portion connected to the corner cutting edge 21 is disposed most inward of the insert in the direction of the insert short side face axial line C3. In addition, the first minor cutting edge 31 extends so as to be gradually inclined outward of the insert in the direction of the insert short side face axial line C3, as the first minor cutting edge 31 extends from the corner cutting edge 21 in the direction of the insert major face axial line C1. In addition, in a directional view of the insert short side face axial line C3 shown in FIG. 8, in the first minor cutting edge 31, an end portion connected to the corner cutting edge 21 is disposed most outward of the insert in the direction of the insert long side face axial line C2. In addition, the first minor cutting edge 31 extends so as to be gradually inclined inward of the insert in the direction of the insert long side face axial line C2, as the first minor cutting edge 31 extends from the corner cutting edge 21 in the direction of the insert major face axial line C1.

The second minor cutting edge 32 has a recessed curved line shape. Specifically, in a directional view of the insert short side face axial line C3 shown in FIG. 8, the second minor cutting edge 32 is formed in the recessed curved line shape so as to be recessed inward of the insert in the direction of the insert long side face axial line C2. In addition, in a directional view of the insert long side face axial line C2 shown in FIG. 6, in the second minor cutting edge 32, an end portion connected to the first minor cutting edge 31 is disposed outward of the insert in the direction of the insert short side face axial line C3. In addition, the second minor cutting edge 32 extends so as to be gradually inclined inward of the insert in the direction of the insert short side face axial line C3, as the second minor cutting edge 32 extends from a portion connected to the first minor cutting edge 31 in the direction of the insert major face axial line C1. As shown in FIGS. 7 and 8, the second minor cutting edge 32 is disposed so as to be recessed most inward of the insert in the direction of the insert long side face axial line C2 in each of the cutting edges 5.

Here, an imaginary plane is conceivable that passes through the center of the cutting insert 3 (intersection of the insert axial lines C1 to C3) and is perpendicular to the insert major face axial line C1. The imaginary plane is perpendicular to the insert major face axial line C1 in FIG. 6, and includes the insert long side face axial line C2 and the insert short side face axial line C3. In the present embodiment, a connecting portion between the first minor cutting edge 31 and the second minor cutting edge 32 in the minor cutting edge 15 is (disposed in the vicinity of the above-described imaginary plane or on the imaginary plane. That is, the connecting portion between the first minor cutting edge 31 and the second minor cutting edge 32 of the minor cutting edge 15 is located substantially at the center of the cutting insert 3 in the thickness direction (direction of the insert major face axial line C1). In addition, in a directional view of the insert long side face axial line C2 shown in FIG. 6, the connecting portion between the first minor cutting edge 31 and the second minor cutting edge 32 is disposed while protruding most outward of the insert in the direction of the insert short side face axial line C3 in each of the cutting edges 5.

The corner cutting edge 21 has a convex curve shape. The corner cutting edge 21 is disposed in a corner portion where an intersection between an extension line of the major cutting edge 14 and an extension line of the first minor cutting edge 31 is located at four corner portions of the long side face 12. In addition, the corner cutting edge 21 is in contact with the cutting edges 14 and 31 while smoothly connecting the major cutting edge 14 and the first minor cutting edge 31 to each other. The extension line of the major cutting edge 14 is an imaginary straight line that extends the major cutting edge 14 to the minor cutting edge 15 side of the same cutting edge 5. In addition, the extension line of the first minor cutting edge 31 is an imaginary straight line that extends the first minor cutting edge 31 to the major cutting edge 14 side of the same cutting edge 5. As shown in FIGS. 7 and 8, the corner cutting edge 21 is disposed while protruding most outward of the insert in the direction of the insert long side face axial line C2 in each of the cutting edges 5.

The connection cutting edge 22 has a convex curve shape. As shown in FIG. 6, the connection cutting edge 22 is disposed in a corner portion where an intersection between an extension line of the major cutting edge 14 and an extension line of the second minor cutting edge 32 in the other cutting edge 5 different from the cutting edge 5 including the major cutting edge 14, in the four corner portions of the long side face 12. As described above, the extension line of the major cutting edge 14 is an imaginary straight line that extends the major cutting edge 14 to a side opposite to the minor cutting edge 15 of the same cutting edge 5. The extension line of the second minor cutting edge 32 is an imaginary straight line that extends the second minor cutting edge 32 to a side opposite to the major cutting edge 14 of the same cutting edge 5. The connection cutting edge 22 connects the pair of substantially L-shaped cutting edges 5 adjacent to each other in the peripheral edge of the long side face 12. Specifically, the cutting edge 5 has an L-shape having at least the major cutting edge 14, the minor cutting edge 15, and the corner cutting edge 21. Two sets of the cutting edge 5 are formed in the peripheral edge of one long side face 12 by a pair of long sides (major cutting edge 14) and a pair of short sides (minor cutting edge 15) that form the peripheral edge of the long side face 12, and a pair of corner portions (corner cutting edge 21) of the long side face 12. Then, the connection cutting edge 22 smoothly connects the major cutting edge 14 (or the second minor cutting edge 32) of one cutting edge 5 of the pair of cutting edges 5 adjacent to each other in the peripheral edge of the long side face 12, and the second minor cutting edge 32 (or the major cutting edge 14) of the other cutting edge 5 to each other. In addition, the connection cutting edge 22 is in contact with the cutting edges 14 and 32.

[Major Face]

The major face 11 has a rectangular shape. Specifically, as shown in FIG. 7, the major face 11 is formed in a parallelogram shape. The major face 11 serves as a flank face (major flank face) of the major cutting edge 14. In a directional view of the insert short side face axial line C3 shown in FIG. 8, the major face 11 has a pair of inclined face portions (first flank face) 23 and a planar portion (second flank face) 24. The inclined face portion 23 is inclined outward of the insert in the direction of the insert major face axial line C1 as the inclined face portion 23 extends from the major cutting edge 14 in the direction of the insert long side face axial line C2. The planar portion 24 is connected to the inside of the insert in the direction of the insert long side face axial line C2 of the inclined face portion 23. The planar portion 24 has a planar shape perpendicular to the insert major face axial line C1.

As shown in FIG. 7, the width of the inclined face portion 23 is largest in the end portion on the corner cutting edge 21 side adjacent to the major cutting edge 14. In addition, the width of the inclined face portion 23 is smallest in the end portion on the connection cutting edge 22 side adjacent to the major cutting edge 14. That is, the width of the inclined face portion 23 gradually decreases along the major cutting edge 14, as the inclined face portion 23 extends from the corner cutting edge 21 to the connection cutting edge 22 side. Here, the width of the inclined face portion 23 represents the length extending inward of the insert from the major cutting edge 14 in the direction of the insert long side face axial line C2.

In the planar portion 24, the larger-diameter portion 17 of the mounting hole 16 is open.

[Long Side Face]

The long side face 12 has a rectangular shape. Specifically, as shown in FIG. 6, the long side face 12 is formed in a rectangular shape that is long in the direction of the insert short side face axial line C3 and is short in the direction of the insert major face axial line C1. The long side face 12 serves as a rake face of the cutting edge 5. As shown in FIGS. 9 to 11, the long side face 12 has a first inclined face portion (first rake face) 25, a second inclined face portion (second rake face) 26, and a planar portion (third rake face) 27. The first inclined face portion 25 is gradually inclined inward of the insert in the direction of the insert long side face axial line C2, as the first inclined face portion 25 extends inward of the long side face 12 from the cutting edge 5. The second inclined face portion 26 is disposed on a side of the first inclined face portion 25 opposite to the cutting edge 5. The planar portion 27 is disposed on a side of the second inclined face portion 26 opposite to the first inclined face portion 25. The planar portion 27 has a planar shape perpendicular to the insert long side face axial line C2.

Figure 5:
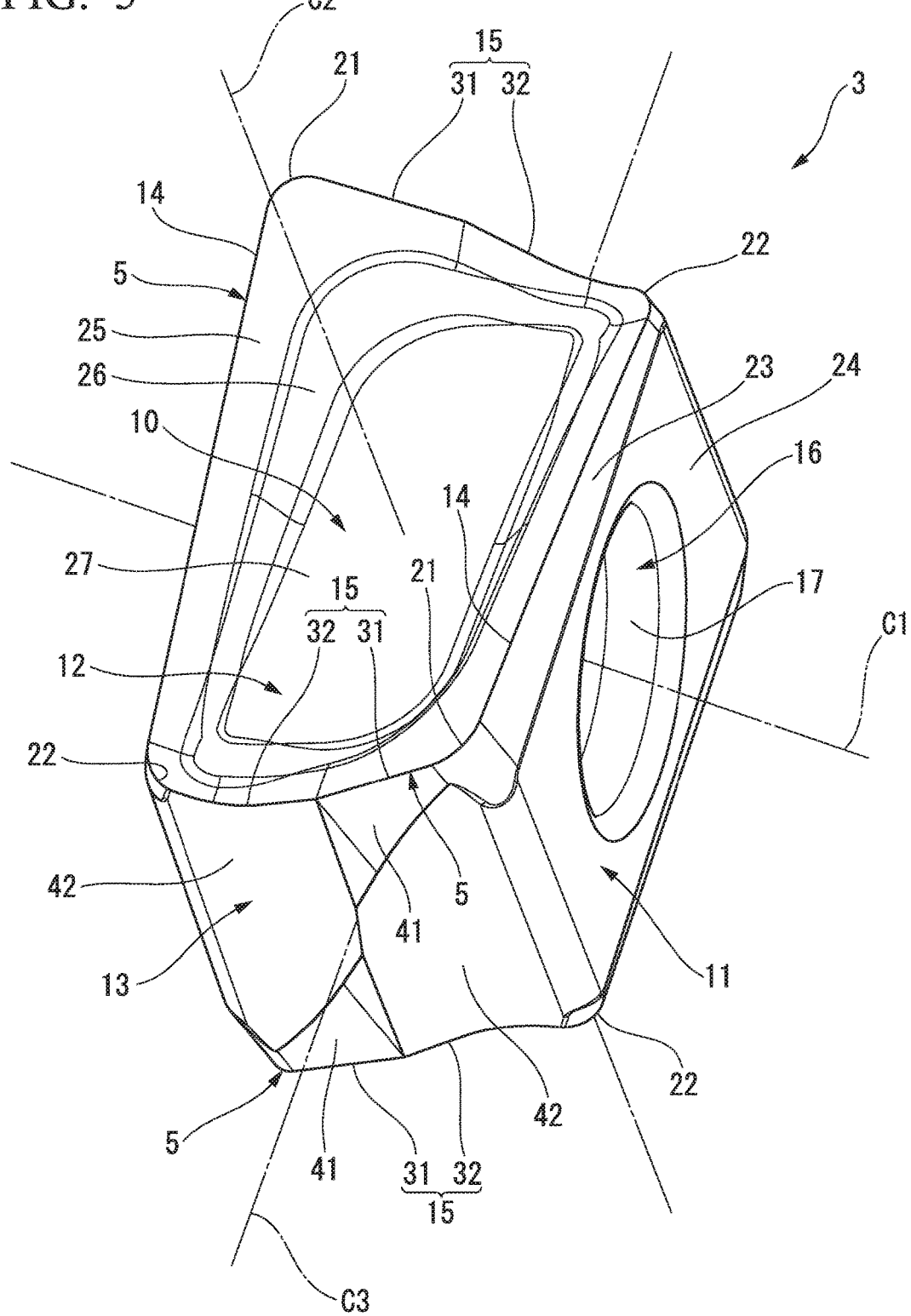
FIG. 5 is a perspective view showing a cutting insert according to the first embodiment.

In FIGS. 5 and 6, the first inclined face portion 25 extends along the cutting edge 5 formed in the outer peripheral edge of the long side face 12. The first inclined face portion 25 has a rectangular frame shape as a whole. The width (length in the direction orthogonal to the cutting edge 5) of the first inclined face portion 25 is largest in a portion corresponding to the corner cutting edge 21. The width of the first inclined face portion 25 is smallest in a portion corresponding to the connection cutting edge 22. In addition, in a portion corresponding to the major cutting edge 14, the width of the first inclined face portion 25 is largest in an end portion on the corner cutting edge 21 side adjacent to the major cutting edge 14. The width of the first inclined face portion 25 gradually decreases as the first inclined face portion 25 extends from an end portion on the corner cutting edge 21 side adjacent to the major cutting edge 14 toward the connection cutting edge 22 side adjacent to the major cutting edge 14. In addition, in a portion corresponding to the minor cutting edge 15, the width of the first inclined face portion 25 is largest in an end portion (end portion of the first minor cutting edge 31) of the corner cutting edge 21 adjacent to the minor cutting edge 15. The width of the first inclined face portion 25 gradually decreases as the first inclined face portion 25 extends from an end portion on the corner cutting edge 21 side adjacent to the minor cutting edge 15 toward the connection cutting edge 22 side adjacent to the minor cutting edge 15.

In addition, in the present embodiment, in the first inclined face portion 25, the portion corresponding to the major cutting edge 14, the portion corresponding to the corner cutting edge 21, and the portion corresponding to the first minor cutting edge 31 respectively have a planar shape. In addition, in the first inclined face portion 25, the portion corresponding to the second minor cutting edge 32 and the portion corresponding to the connection cutting edge 22 are formed in a recessed curved face shape.

The second inclined face portion 26 extends along the first inclined face portion 25. The second inclined face portion 26 has a rectangular frame shape as a whole.

As shown in FIGS. 5, 8, and 9 to 11, in the second inclined face portion 26, the portion corresponding to the major cutting edge 14, the portion corresponding to the corner cutting edge 21, the portion corresponding to the first minor cutting edge 31, and the portion corresponding to the portion (specifically, approximately half on the first minor cutting edge 31 side in the length of the second minor cutting edge 32) located on the first minor cutting edge 31 side in the second minor cutting edge 32 are gradually inclined inward of the insert in the direction of the insert long side face axial line C2, as these portions extend inward of the long side face 12 from the first inclined face portion 25. The inclination of these portions of the second inclined face portion 26 is sharper than the inclination of each portion of the first inclined face portion 25 located outward of the long side face 12 corresponding to these portions. The inclination of the first inclined face portion 25 and the second inclined face portion 26 represents the amount of being displaced inward of the insert in the direction of the insert long side face axial line C2, per unit length extending inward of the long side face 12 along the imaginary plane perpendicular to the insert long side face axial line C2.

In addition, in the second inclined face portion 26, the portion corresponding to the portion (specifically, approximately half on the connection cutting edge 22 side of the length of the second minor cutting edge 32) located on the connection cutting edge 22 side in the second minor cutting edge 32 and the portion corresponding to the connection cutting edge 22 are gradually inclined outward of the insert in the direction of the insert long side face axial line C2, as these portions extend inward of the long side face 12 from the first inclined face portion 25 (refer to FIGS. 10 and 11).

In addition, as shown in FIG. 6, the planar portion 27 has a rectangular shape.

[Short Side Face]

The short side face 13 has a rectangular shape. Specifically, as shown in FIG. 8, the short side face 13 is formed in a parallelogram shape. The short side face 13 serves as a flank face (minor flank face) of the minor cutting edge 15. The short side face 13 has a first minor flank face (flank face of the first minor cutting edge) 41 and a second minor flank face (flank face of the second minor cutting edge) 42. The first minor flank face 41 extends from the first minor cutting edge 31 in the direction of the insert long side face axial line C2 in the minor cutting edge 15. The second minor flank face 42 extends from the second minor cutting edge 32 in the direction of the insert long side face axial line C2. The first minor flank face 41 and the second minor flank face 42 are formed in a rectangular shape, and specifically, are formed in a trapezoidal shape. In addition, the first minor flank face 41 and the second minor flank face 42 are respectively formed in a planar shape. The length of the second minor flank face 42 in the direction of the insert long side face axial line C2 is longer than the length of the first minor flank face 41 in the direction of the insert long side face axial line C2.

On the short side face 13, the second minor flank face 42 is connected to the side opposite to the first minor cutting edge 31 along the direction of the insert long side face axial line C2 of the first minor flank face 41. In addition, the first minor flank face 41 is connected to the side opposite to the second minor cutting edge 32 along the direction of the insert long side face axial line C2 of the second minor flank face 42. That is, in the short side face 13, the first minor flank face 41 and the second minor flank face 42 are formed between the first minor cutting edge 31 and the second minor cutting edge 32 that are arranged in both end edges in the direction of the insert long side face axial line C2. The first minor flank face 41 and the second minor flank face 42 are connected in this order from the first minor cutting edge 31 to the second minor cutting edge 32. In addition, the second minor flank face 42 and the first minor flank face 41 are formed between the second minor cutting edge 32 and the first minor cutting edge 31 that are arranged in both end edges in the direction of the insert long side face axial line C2. The second minor flank face 42 and the first minor flank face 41 are connected in this order from the second minor cutting edge 32 toward the first minor cutting edge 31.

Therefore, the first minor flank face 41 and the second minor flank face 42 serves as a flank face (minor flank face) of the minor cutting edge 15, and functions as follows.

That is, in the first minor cutting edge 31, the first minor flank face 41 substantially functions as the first minor flank face (first minor flank face connected to the minor cutting edge). In addition, the second minor flank face 42 is disposed adjacent to the side opposite to the first minor flank face 41 along the direction of the insert long side face axial line C2 with respect to the first minor cutting edge 31, and substantially functions as the second minor flank face (minor flank face that is the second counted from the minor cutting edge).

On the other hand, in the second minor cutting edge 32, the second minor flank face 42 substantially functions as the first minor flank face (first minor flank face connected to the minor cutting edge). In addition, the first minor flank face 41 is disposed adjacent to the side opposite to the second minor flank face 42 along the direction of the insert long side face axial line C2 with respect to the second minor cutting edge 32, and substantially functions as the second minor flank face (minor flank face that is the second counted from the minor cutting edge).

In the description herein, in a case where "the flank face of the first minor cutting edge 31" is simply referred to, the term indicates "the first minor flank face 41", and in a case where "the flank face of the second minor cutting edge 32" is simply referred to, the term indicates "the second minor flank face 42".

As shown in FIGS. 7 and 10, in a directional view of the insert major face axial line C1, the flank face (second minor flank face 42) of the second minor cutting edge 32 formed on the short side face 13 is inclined outward of the insert in the direction of the insert short side face axial line C3, as the flank face extends from the second minor cutting edge 32 in the direction of the insert long side face axial line C2. In addition, as shown in FIG. 12, in a directional view of the insert long side face axial line C2, the second minor flank face 42 is formed so as to be inclined outward of the insert in the direction of the insert short side face axial line C3, as the second minor flank face 42 extends from the major face 11 adjacent to the second minor flank face 42 in the direction of the insert major face axial line C1.

Then, as shown in FIG. 8, in a directional view of the insert short side face axial line C3, in the flank face (first minor flank face 41) of the first minor cutting edge 31 formed on the short side face 13, the length (that is, the "width" of the flank face) in the direction of the insert major face axial line C1 decreases as the flank face extends from the first minor cutting edge 31 in the direction of the insert long side face axial line C2. A ridgeline is formed at a boundary between the first minor flank face 41 and the second minor flank face 42 adjacent to the first minor flank face 41 in the direction of the insert long side face axial line C2. This ridgeline extends so as to be inclined inward of the insert in the direction of the insert major face axial line C1, as the ridgeline faces inward in the direction of the insert long side face axial line C2 (as the ridgeline faces inward of the insert in the direction of the insert long side face axial line C2) from the first minor cutting edge 31. In this manner, the length (width) of the first minor flank face 41 in the direction of the insert major face axial line C1 gradually decreases as the first minor flank face 41 faces inward of the insert in the direction of the insert long side face axial line C2.

In the present embodiment, the length (width) of the first minor flank face 41 in the direction of the insert major face axial line C1 becomes zero in an inner side end portion of the insert in the direction of the insert long side face axial line C2 of the first minor flank face 41. Therefore, the flank faces (first minor flank faces 41) of the pair of first minor cutting edges 31 are apart from each other without being connected to each other. The pair of first minor cutting edges 31 extends from the pair of first minor cutting edges 31 located at both end edges in the direction of the insert long side face axial line C2 in the short side face 13 toward the mutually opposite sides in the direction of the insert long side face axial line C2.

Then, the pair of first minor flank faces 41 formed on the short side face 13 is formed in mutually different planes. Specifically, the pair of first minor flank faces 41 of the short side face 13 is separately formed. The pair of first minor flank faces 41 is not disposed parallel to each other while having mutually different plane inclinations. Therefore, the pair of first minor flank faces 41 is not included in the same plane.

In addition, the flank face (second minor flank face 42) of the pair of second minor cutting edge 32 is disposed adjacent to each other in the direction of the insert major face axial line C1. That is, the pair of second minor flank faces 42 formed on the short side face 13 is directly connected to (intersect) each other so as to be adjacent to each other in the direction of the insert major face axial line C1. The flank faces (second minor flank faces 42) of the pair of second minor cutting edges 32 extend toward mutually opposite sides along the direction of the insert long side face axial line C2 from the pair of second minor cutting edges 32 located at both end edges of the short side face 13 in the direction of the insert long side face axial line C2.

Then, the pair of the second minor flank faces 42 formed on the short side face 13 is formed in mutually different planes. The pair of second minor flank faces 42 has mutually different plane inclinations. In addition, the first minor flank face 41 and the second minor flank face 42 are formed in mutually different planes. The first minor flank face 41 and the second minor flank face 42 have mutually different plane inclinations.

Therefore, four mutually different planes including at least the pair of first minor flank faces 41 and the pair of second minor flank faces 42 are formed on the short side face 13.

In addition, as shown in FIG. 8, a connecting portion (intersection ridge portion) of the pair of second minor flank faces 42 on the short side face 13 extends substantially along the direction of the insert long side face axial line C2. Specifically, the connecting portion between the pair of second minor flank faces 42 passes through the intersection of the insert axial lines C1 to C3 in a directional view of the insert short side face axial line C3. The connecting portion (intersection ridge portion) of the pair of second minor flank faces 42 is slightly inclined with respect to the imaginary plane perpendicular to the insert major face axial line C1. In addition, as shown in FIG. 12, in a directional view of the insert long side face axial line C2, the connecting portion (intersection ridge portion) between the pair of second minor flank faces 42 on the short side face 13 is disposed while protruding most outward of the insert in the direction of the insert short side face axial line C3 on the short side face 13.

The length (width) in the direction of the insert major face axial line C1 on the flank face (second minor flank face 42) of the second minor cutting edge 32 in a directional view of the insert short side face axial line C3 shown in FIG. 8 will be described. With regard to the width of the second minor flank face 42, the width of the portion adjacent to the second minor cutting edge 32 is larger than the width of an end portion located on a side opposite to the second minor cutting edge 32 in the direction of the insert long side face axial line C2, in the second minor cutting edge 32.

Specifically, the width of the second minor flank face 42 has a substantially constant size in a range from the second minor cutting edge 32 to the central portion of the short side face 13 in the direction of the insert long side face axial line C2. In addition, the width of the second minor flank face 42 gradually decreases as the second minor flank face 42 faces the end portion located on the side opposite to the second minor cutting edge 32 from the central portion.

In addition, on the flank face (the second minor flank face 42) of the second minor cutting edge 32, the end portion located on the side opposite to the second minor cutting edge 32 in the direction of the insert long side face axial line C2 and the flank face (first minor flank face 41) of the first minor cutting edge 31 located at an end edge opposite to the second minor cutting edge 32 in the direction of the insert long side face axial line C2 are arranged adjacent to each other in the direction of the insert major face axial line C1. In the example according to the present embodiment, on the short side face 13, the end portion of the second minor flank face 42 is disposed adjacent to the first minor flank face 41 on the outside of the insert in the direction of the insert major face axial line C1.

In the addition, the flank face (second minor flank face 42) of the second minor cutting edge 32 formed on the short side face 13 does not reach the first minor cutting edge 31 located at the end edge of the short side face 13 on the side opposite to the second minor cutting edge 32 in the direction of the insert long side face axial line C2.

[Insert Restriction Angle of Cutting Insert]

In a directional view of the insert major face axial line C1 shown in FIG. 10, an angle formed between the flank face (second minor flank face 42) of the second minor cutting edge 32 formed on the short side face 13 and the planar portion 27 of the long side face 12 connected to the short side face 13 via the first minor cutting edge 31 located at the end edge of the short side face 13 on the side opposite to the second minor cutting edge 32 along the direction of the insert long side face axial line C2 is set to a first insert restriction angle θ1. The first insert restriction angle θ1 is smaller than 90°.

In addition, in a directional view of the insert long side face axial line C2 shown in FIG. 12, an angle formed between one second minor flank face 42 of the pair of second minor flank faces 42 formed on the short side face 13 and the planar portion 24 of the major face 11 adjacent to the other second minor flank face 42 is set to as a second insert restriction angle θ2. The second insert restriction angle θ2 is smaller than 90°.

[Insert Mounting Seat]

As shown in FIGS. 13 to 16, the insert mounting seat 4 of the tool main body 2 has a major face mounting wall 51, a long side face mounting wall 52, and a short side face mounting wall 53. The major face mounting wall 51 faces outward in the tool radial direction, and abuts against the major face 11 of the cutting insert 3. The long side face mounting wall 52 faces the tool rotation direction T, and abuts against the long side face 12 of the cutting insert 3. The short side face mounting wall 53 faces the tool distal end side, and abuts against the second minor flank face 42 located outward in the tool radial direction, on the flank face (second minor flank face 42) of the pair of second minor cutting edges 32 formed on the short side face 13.

Figure 14:
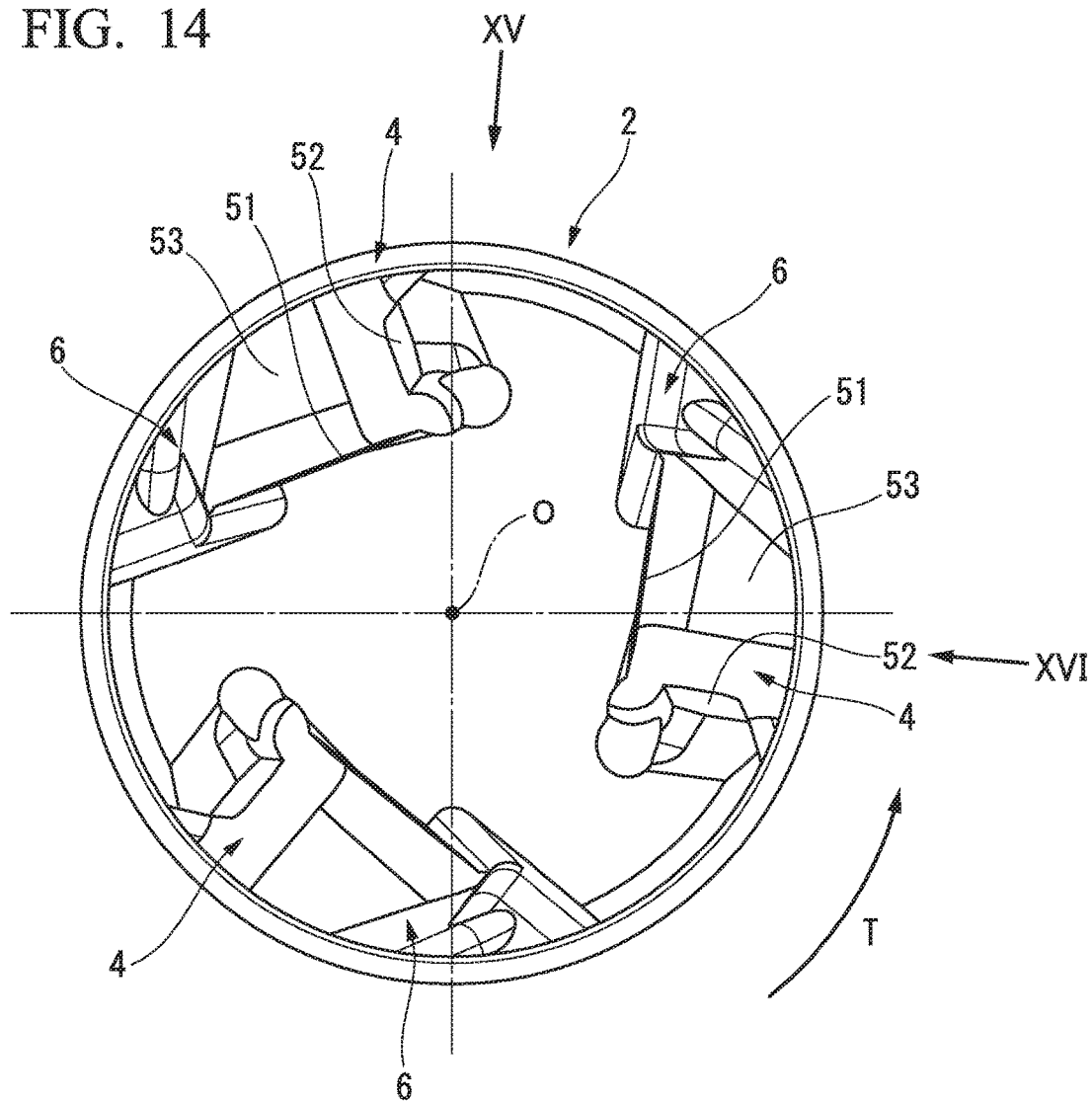
FIG. 14 is a front view when the tool main body is viewed from the distal end toward the posterior side in the direction of the tool axial line.
Figure 15:
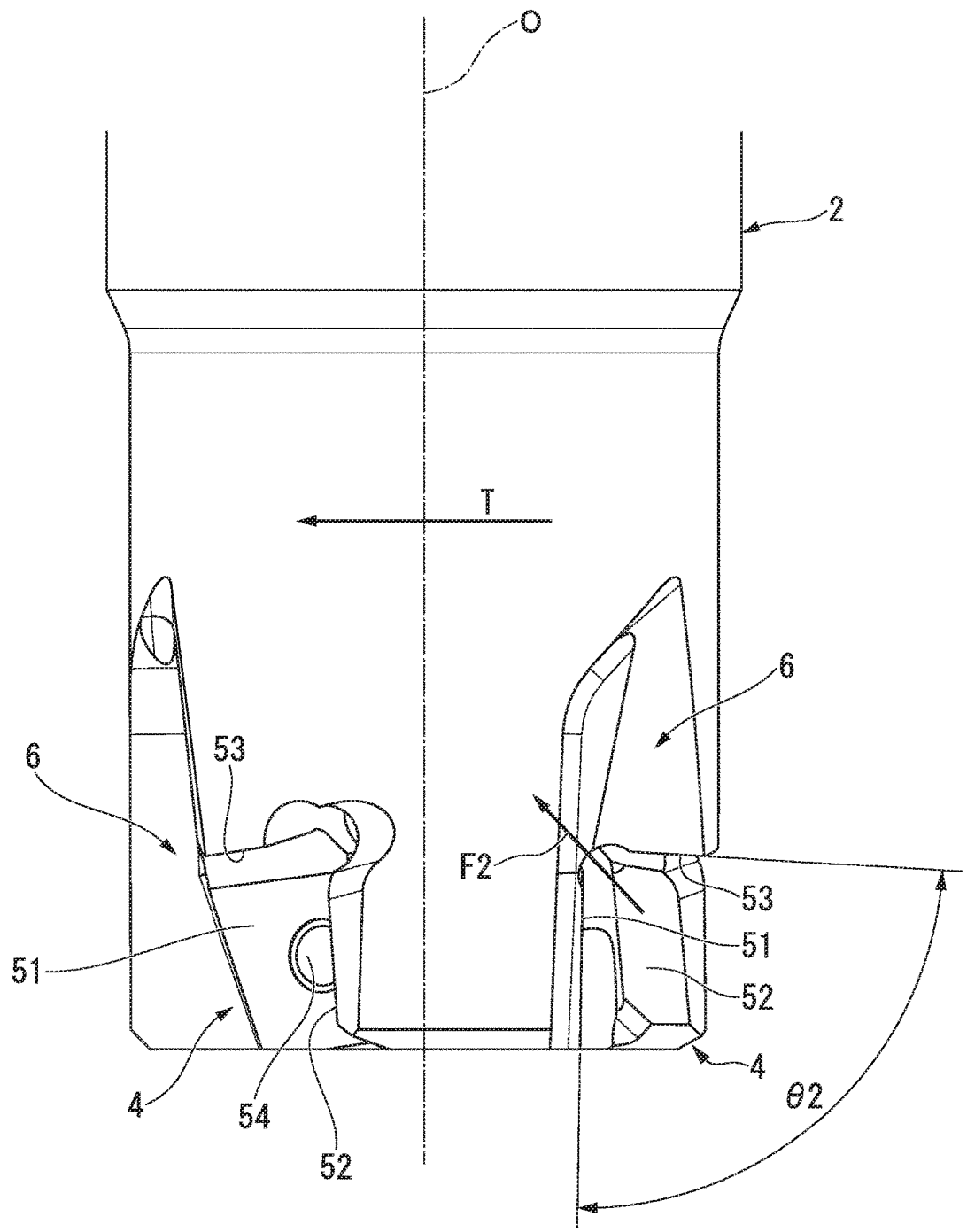
FIG. 15 is a side view when the tool main body is viewed in a direction XV in FIG. 14.

The major face mounting wall 51 has a planar shape. The major face mounting wall 51 abuts against the planar portion 24 on the major face 11 of the cutting insert 3. The major face mounting wall 51 has a rectangular shape corresponding to a shape of the major face 11. As shown in FIG. 14, the major face mounting wall 51 is formed so as to be inclined outward in the tool radial direction as the major face mounting wall 51 faces the tool rotation direction T. In addition, as shown in FIG. 15, the major face mounting wall 51 is formed so as to be inclined inward in the tool radial direction as the major face mounting wall 51 faces the tool distal end side. A screw hole 54 into which the screw shaft portion of the clamp screw 20 is screwed is open on the major face mounting wall 51.

Figure 16:
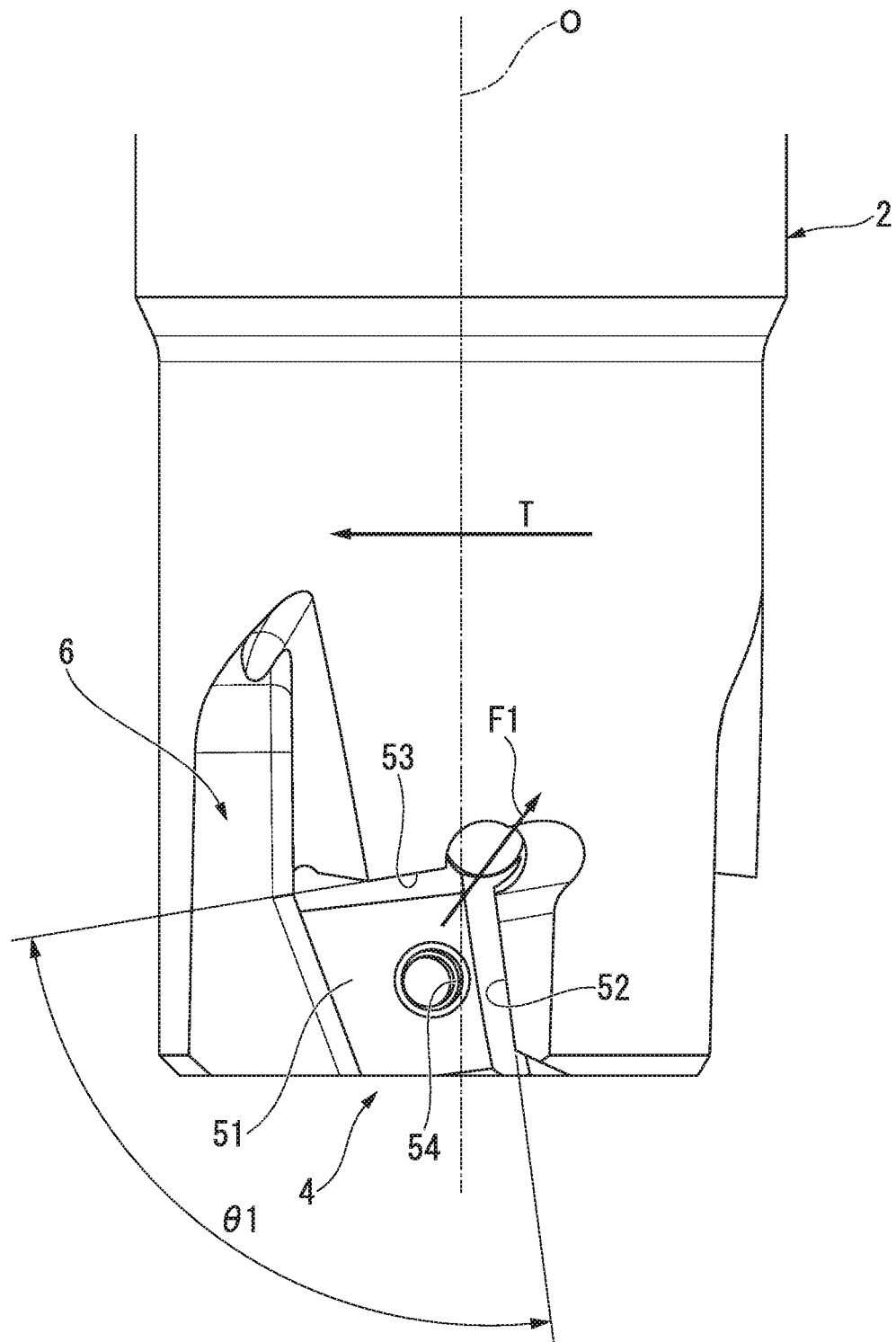
FIG. 16 is a side view when the tool main body is viewed in a direction XVI in FIG. 14.

The long side face mounting wall 52 has a planar shape. The long side face mounting wall 52 abuts against the planar portion 27 on the long side face 12 of the cutting insert 3. The long side face mounting wall 52 has a rectangular shape corresponding to a shape of the long side face 12. As shown in FIG. 16, the long side face mounting wall 52 is formed so as to be inclined toward a side opposite to the tool rotation direction T as the long side face mounting wall 52 faces the tool distal end side.

The short side face mounting wall 53 has a planar shape. The short side face mounting wall 53 abuts against one second minor flank face 42 disposed outward in the tool radial direction when the cutting insert 3 is mounted to the insert mounting seat 4, in the pair of second minor flank faces 42 on the short side face 13 of the cutting insert 3.

Specifically, the short side face mounting wall 53 abuts against only one second minor flank face 42 disposed outward in the tool radial direction in the pair of second minor flank faces 42 belonging to the short side face 13, and does not abut against the other second minor flank face 42 disposed inward in the tool radial direction.

The short side face mounting wall 53 has a rectangular shape (trapezoidal shape) corresponding to a shape of the second minor flank face 42. As shown in FIG. 15, the short side face mounting wall 53 is formed so as to be inclined toward the tool distal end side as the short side face mounting wall 53 faces outward in the tool radial direction. In addition, as shown in FIG. 16, the short side face mounting wall 53 is formed so as to be inclined toward the tool distal end side as the short side face mounting wall 53 faces the tool rotation direction T.

The reference numeral θ1 in FIG. 16 represents an angle (first insert restriction angle) formed between the short side face mounting wall 53 and the long side face mounting wall 52 in the insert mounting seat 4. The angle θ1 is smaller than 90°. The angle θ1 of the insert mounting seat 4 is equal to the first insert restriction angle θ1 of the cutting insert 3 shown in FIG. 10.

In addition, the reference numeral θ2 in FIG. 15 represents an angle (second insert restriction angle) formed between the major face mounting wall 51 and the short side face mounting wall 53 in the insert mounting seat 4. The angle θ2 is smaller than 90°. The angle θ2 of the insert mounting seat 4 is equal to the second insert restriction angle θ2 of the cutting insert 3 shown in FIG. 12.

[Mounting Posture of Cutting Insert Mounted to Insert Mounting Seat]

In FIGS. 1 to 4, if the cutting insert 3 is mounted to the insert mounting seat 4, in the pair of major faces 11 of the cutting insert 3, one major face 11 facing inward in the tool radial direction abuts against the major face mounting wall 51 facing outward in the tool radial direction in the insert mounting seat 4. In addition, the other major face 11 is disposed so as to face outward in the tool radial direction, and serves as the flank face of the major cutting edge 14. In addition, in the pair of long side faces 12 of the cutting insert 3, one long side face 12 facing the side opposite to the tool rotation direction T abuts against the long side face mounting wall 52 facing the tool rotation direction T in the insert mounting seat 4. The other long side face 12 is disposed so as to face the tool rotation direction T, and serves as the rake face of the cutting edge 5 (the major cutting edge 14, the corner cutting edge 21, and the minor cutting edge 15). In addition, in the pair of short side faces 13 of the cutting insert 3, one short side face 13 facing the tool posterior side abuts against the short side face mounting wall 53 facing the tool distal end side in the insert mounting seat 4. The other short side face 13 is disposed so as to face the tool distal end side, and serves as the flank face of the minor cutting edge 15.

In FIG. 3, when the cutting insert 3 is mounted to the insert mounting seat 4, although not specifically shown, the insert long side face axial line C2 of the cutting insert 3 extends so as to be gradually inclined toward the tool distal end side, as the insert long side face axial line C2 faces the tool rotation direction T. In addition, the insert short side face axial line C3 is gradually inclined toward the side opposite to the tool rotation direction T as the insert short side face axial line C3 faces the tool distal end side. The insert short side face axial line C3 extends so as to be gradually inclined inward in the tool radial direction as the insert short side face axial line C3 faces the tool distal end side. In addition, the insert major face axial line C1 extends so as to be gradually inclined toward the tool distal end side as the insert major face axial line C1 faces outward in the tool radial direction.

[Operation Effect According to Present Embodiment]

According to the cutting insert 3 and the indexable cutting tool 1 using the cutting insert 3 of the present embodiment described above, the minor cutting edge 15 of the cutting insert 3 has the first minor cutting edge 31 and the second minor cutting edge 32. The first minor cutting edge 31 is connected to the major cutting edge 14. The second minor cutting edge 32 is connected to the end portion of the first minor cutting edge 31 on the side opposite to the major cutting edge 14. The second minor cutting edge 32 extends so as to be inclined inward of the insert in the direction of the insert short side face axial line C3, as the second minor cutting edge 32 extends from the end portion of the first minor cutting edge 31 in the direction of the insert major face axial line C1. Therefore, as in the present embodiment, the first minor cutting edge 31 of the minor cutting edge 15 is used as the cutting edge (flat cutting edge) for the finish operation, and the second minor cutting edge 32 is used as the cutting edge (the ramping cutting edge) for the ramping operation.

Specifically, when the cutting insert 3 is mounted to the insert mounting seat 4 of the tool main body 2, the first minor cutting edge 31 is disposed in an imaginary plane perpendicular to the tool axial line O. In this manner, the first minor cutting edge 31 can be used as the flat cutting edge. In addition, the second minor cutting edge 32 is inclined toward the tool posterior side, as the second minor cutting edge 32 faces inward in the tool radial direction from the portion connected to the first minor cutting edge 31. In this manner, the second minor cutting edge 32 can be used as the ramping cutting edge.

In this manner, one indexable cutting tool 1 can perform not only the face milling operation or the shoulder milling (peripheral milling) operation on the work material, but also the pocket hole digging operation (deep digging operation) using the ramping operation, for example. Therefore, it is possible to intensively use tools by minimizing types of the tools. It is possible to continuously perform various tool rotating cutting process, and it is possible to shorten an operation period of time.

In addition, the flank face (second minor flank face 42) of the second minor cutting edge 32 formed on the short side face 13 of the cutting insert 3 is inclined outward of the insert in the direction of the insert short side face axial line C3, as the flank face is extended from the second minor cutting edge 32 in the direction of the insert long side face axial line C2. In this manner, the clearance angle of the second minor cutting edge 32 when the cutting insert 3 is viewed as a single body is set to the negative angle. Therefore, it is possible to secure a large tool angle of the second minor cutting edge 32.

That is, when the second minor cutting edge 32 is used as the ramping cutting edge as described above, strong cutting resistance acts on the second minor cutting edge 32. However, the second minor cutting edge 32 secures the large tool angle of the major cutting edge. Accordingly, the edge tip strength can be improved, and the cutting edge defect can be suppressed. Therefore, the tool rotating cutting process can be stably performed.

When the indexable cutting tool 1 is viewed as a whole, the mounting posture of the cutting insert 3 mounted to the insert mounting seat 4 is set as described in the present embodiment. In this manner, the substantial clearance angle of the second minor cutting edge 32 can be set to the positive angle (right angle). That is, the cutting insert 3 is disposed in the insert mounting seat 4 so that the flank face (second minor flank face 42) of the second minor cutting edge 32 is inclined toward the tool posterior side, as the flank face extends toward the opposite side in the tool rotation direction T from the second minor cutting edge 32. In this manner, the clearance angle of the second minor cutting edge 32 during the tool rotating cutting process can be substantially set to the positive angle. Furthermore, contact between the second minor flank face 42 and the machined surface of the work material is prevented, thereby enabling a satisfactory tool rotating cutting process.

In addition, the clearance angle of the second minor cutting edge 32 is set to the negative angle as the single body of the cutting insert 3. Accordingly, it is possible to obtain an advantageous effect of improving the mounting stability of the cutting insert 3 mounted to the insert mounting seat 4.

Specifically, when the cutting insert 3 is mounted to the insert mounting seat 4 of the tool main body 2, as shown in FIGS. 3 and 4, in the insert mounting seat 4, the short side face mounting wall 53 facing the tool distal end side abuts against the second minor flank face 42 located outward in the tool radial direction, out of the flank faces (second minor flank face 42) of the pair of second minor cutting edges 32 of the short side face 13 facing the short side face mounting wall 53. In addition, the long side face mounting wall 52 facing the tool rotation direction T in the insert mounting seat 4 abuts against the long side face 12 facing the long side face mounting wall 52. Therefore, when the cutting insert 3 facing inward in the tool radial direction is viewed (the major face 11 is viewed in the direction of the insert major face axial line C1 from the front), the angle θ1 (first insert restriction angle, refer to FIG. 16) formed between the short side face mounting wall 53 and the long side face mounting wall 52 of the insert mounting seat 4 can be set to an angle smaller than 90°. Therefore, a pulling force (force in an arrow direction indicated by the reference numeral F1 in FIG. 16) acting toward an apex side of the angle θ1 can be generated for the cutting insert 3 restricted by the short side face mounting wall 53 and the long side face mounting wall 52 of the insert mounting seat 4. In this manner, rattling (floating) of the cutting insert 3 is suppressed during the tool rotating cutting process, and thus, the mounting stability can be improved.

In addition, the flank face (second minor flank face 42) of the second minor cutting edge 32 is inclined outward of the insert in the direction of the insert short side face axial line C3, as the flank face is extended in the direction of the insert major face axial line C1 from the major face 11 adjacent to the second minor flank face 42. Accordingly, according to this configuration, it is also possible to obtain an advantageous effect of improving the mounting stability of the cutting insert 3 mounted to the insert mounting seat 4.

Specifically, when the cutting insert 3 is mounted to the insert mounting seat 4 of the tool main body 2, as shown in FIG. 3, the short side face mounting wall 53 facing the tool distal end side in the insert mounting seat 4 abuts against the second minor flank face 42 located outward in the tool radial direction, out of the flank faces (second minor flank faces 42) of the pair of second minor cutting edges 32 of the short side face 13 facing the short side face mounting wall 53. In addition, the major face mounting wall 51 facing the outward in the tool radial direction in the insert mounting seat 4 abuts against the major face 11 facing the major face mounting wall 51. Therefore, when the cutting insert 3 facing the side opposite to the tool rotation direction T (when the long side face 12 is viewed in the direction of the insert long side face axial line C2 from the front), the angle θ2 (second insert restriction angle, refer to FIG. 15) formed between the short side face mounting wall 53 and the major face mounting wall 51 of the mounting insert seat 4 can be set to an angle smaller than 90°. Therefore, a pulling force (force in an arrow direction indicated by the reference numeral F2 in FIG. 15) acting toward an apex side of the angle θ2 can be generated for the cutting insert 3 restricted by the short side face mounting wall 53 and the major face mounting wall 51 of the insert mounting seat 4. In this manner, rattling (floating) of the cutting insert 3 is suppressed during the tool rotating cutting process, and thus, the mounting stability can be improved.

Then, in the flank face (first minor flank face 41) of the first minor cutting edge 31 formed on the short side face 13 of the cutting insert 3, the length (width) in the direction of the insert major face axial line C1 decreases as the flank face extends from the first minor cutting edge 31 in the direction of the insert long side face axial line C2. In this manner, according to the present embodiment, it is possible to secure a large area of the flank face (second minor flank face 42) of the second minor cutting edge 32.

Specifically, as shown in FIG. 8, the first minor cutting edge 31 and the second minor cutting edge 32 that are located at both end edges in the direction of the insert long side face axial line C2 on the short side face 13, the flank faces (the first minor flank face 41 and the second minor flank face 42) are arranged adjacent to each other. Therefore, as described above, the flank face (first minor flank face 41) of the first minor cutting edge 31 is formed to have a narrower width, as the flank face extends from the first minor cutting edge 31 in the direction of the insert long side face axial line C2. Correspondingly, the flank face (second minor flank face 42) of the second minor cutting edge 32 adjacent to the flank face (first minor flank face 41) of the first minor cutting edge 31 is formed to have a wider width, as the face extends from the first minor cutting edge 31 in the direction of the insert long side face axial line C2.

In this manner, the short side face mounting wall 53 facing the tool distal end side in the insert mounting seat 4 can be brought into contact with the flank face (second minor flank face 42) of the second minor cutting edge 32 in a wide range. The cutting insert 3 can be stably fixed to the insert mounting seat 4. Therefore, the above-described advantageous effect of improving the mounting stability of the cutting insert 3 can be more remarkably obtained.

In addition, the flank faces (first minor flank faces 41) of the pair of first minor cutting edges 31 formed on the short side face 13 are formed in mutually different planes. In this manner, the first minor flank face 41 can be relatively freely formed in various different ways so as to satisfy desired cutting performance.

Specifically, for example, the clearance angle of the first minor cutting edge 31 when the cutting insert 3 is viewed as a single body is set to the negative angle. Accordingly, a large tool angle of the first minor cutting edge 31 can be secured large. Alternatively, the clearance angle of the first minor cutting edge 31 is set to the positive angle (right angle). In this manner, while the clearance angle of the first minor cutting edge 31 is secured during the tool rotating cutting process, the rake angle is increased on the positive side, thereby enabling cutting quality to be improved. In a case where the clearance angle of the first minor cutting edge 31 is set to the positive angle, it is preferable to dispose another plane (connecting face) connecting the flank faces to each other between the first minor flank face 41 and the second minor flank face 42 that are adjacent to each other in the direction of the insert long side face axial line C2 on the short side face 13.

That is, according to the present embodiment, the flank faces (first minor flank faces 41) of the pair of first minor cutting edges 31 formed on the short side face 13 are formed in mutually different planes. Therefore, the first minor flank faces 41 are less likely to affect mutual arrangement, shape, or inclination. In this manner, it is possible to suppress the limitations on the tool angle or the clearance angle of the first minor cutting edge 31. Therefore, it is possible to remarkably improve the cutting performance such as defect resistance and operation accuracy of the edge tip.

As described above, according to the cutting insert 3 and the indexable cutting tool 1 using the cutting insert 3 of the present embodiment, it is possible to perform not only the face milling operation or the shoulder milling operation, but also the ramping operation. In addition, according to the cutting insert 3 and the indexable cutting tool 1 using the cutting insert 3 of the present embodiment, it is possible to improve the mounting stability of the cutting insert 3 mounted to the insert mounting seat 4 during the tool rotating cutting process, thereby enabling the cutting performance to be improved.

In the present embodiment, the clearance angle of the second minor cutting edge 32 serves as the negative angle, and the flank face (second minor flank face 42) of the second minor cutting edge 32 is inclined outward of the insert in the direction of the insert short side face axial line C3, as the flank face extends in the direction of the insert major face axial line C1 from the major face 11 adjacent to the second minor flank face 42. In this manner, the following operation effect can be obtained.

That is, in the cutting insert 3 mounted to the insert mounting seat 4 of the tool main body 2, with respect to the rotation locus around the tool axial line O of the major cutting edge 14 used for the tool rotating cutting process, the corner portion (refer to FIG. 2) of the cutting insert 3 located rearward in the tool rotation direction T of the major cutting edge 14 can be disposed closer to the inside in the tool radial direction from the rotation locus. Therefore, it is possible to stably improve accuracy in the tool rotating cutting process. The corner portion of the above-described cutting insert 3 is located at the outer end portion of the insert in the insert major face axial line C1 (outer end portion in the tool radial direction) in the second minor cutting edge 32 located on the side opposite to the tool rotation direction T from the major cutting edge 14.

Specifically, in the cutting insert of the vertical cutting edge double-sided type in the related art, it is difficult to secure the second clearance of the major cutting edge. The cutting insert is less likely to secure the second clearance, particularly when the diameter of the rotation locus of the major cutting edge became smaller (that is, the diameter of the tool rotating cutting process became smaller).

On the other hand, according to the present embodiment, as described above, with respect to the rotation locus of the major cutting edge 14, the corner portion of the cutting insert 3 located rearward in the tool rotation direction T of the major cutting edge 14 is easily disposed by moving the corner portion rearward and inward in the tool radial direction. Therefore, even in a case where the diameter for the tool rotating cutting process is set to be small, the second clearance of the major cutting edge 14 can be secured, and the tool rotating cutting process accuracy can be satisfactorily maintained. It is generally known that the end portion on the tool distal end side of the major cutting edge 14 is likely to be affected by deflection caused by a cutting load. If a large amount of the second clearance is secured as in the present embodiment, it is possible to reliably suppress damage to the tool even in a case where the deflection occurs, and thus, it is possible to prolong a tool life.

In addition, in the present embodiment, the flank face (second minor flank face 42) of the second minor cutting edge 32 formed on the short side face 13 of the cutting insert 3 does not reach the first minor cutting edge 31 located at the end edge on the side opposite to the second minor cutting edge 32 in the direction of the insert long side face axial line C2, on the short side face 13. Accordingly, the following operation effect can be obtained.

That is, in this case, the second minor flank face 42 can be prevented from affecting the shape of the first minor cutting edge 31 located at the end edge on the side opposite to the second minor cutting edge 32 in the direction of the insert long side face axial line C2. In addition, at the same time, as described above, a large area of the second minor flank face 42 can be secured. For example, if the second minor flank face 42 is simply formed large, a possibility is conceivable that the second minor flank face 42 may reach the first minor cutting edge 31 located at the end edge on the side opposite to the second minor cutting edge 32 in the direction of the insert long side face axial line C2 on the short side face 13 and may affect a shape and a function of the first minor cutting edge 31. According to the above-described configuration as the present embodiment, this disadvantage can be prevented. Therefore, the first minor cutting edge 31 can stably function as the flat cutting edge, for example, while the above-described operation effect can be remarkably obtained by the second minor flank face 42.

In addition, in the present embodiment, 14 in a directional view of the insert short side face axial line C3, (the inclined face portion 23 of) the major face 11 of the cutting insert 3 is inclined outward of the insert in the direction of the insert major face axial line C1, as the major face 11 extends from the major cutting edge 14 in the direction of the insert long side face axial line C2. Accordingly, the following operation effect can be obtained.

That is, in this case, the flank face (the inclined face portion 23 serving as the first flank face) of the major cutting edge 14 formed on the major face 11 of the cutting insert 3 is inclined outward of the insert in the direction of the insert major face axial line C1, as the flank face extends from the major cutting edge 14 in the direction of the insert long side face axial line C2. Therefore, the clearance angle of the major cutting edge 14 when the cutting insert 3 is viewed as a single body is set to the negative angle. Therefore, it is possible to secure a large a tool angle of the major cutting edge 14.

Specifically, in the cutting insert 3 of the vertical cutting edge type as in the present embodiment, a heavy tool rotating cutting process (highly efficient operation) is generally required. In the cutting insert 3 of the vertical cutting edge type, strong cutting resistance acts particularly on the major cutting edge 14 due to high level cutting and high level feeding, and high rigidity that can withstand this cutting resistance is required. Therefore, if the large tool angle of the major cutting edge 14 is secured as described above, the edge tip strength can be sufficiently improved, and the cutting edge defect can be suppressed. Therefore, the tool rotating cutting process (particularly, the heavy tool rotating cutting process) can be stably performed.

In addition, in the present embodiment, on the second minor flank face 42, the length (width) in the direction of the insert major face axial line C1 on the flank face (second minor flank face 42) of the second minor cutting edge 32 is larger than the width of the end portion located on the side opposite to the second minor cutting edge 32 in the direction of the insert long side face axial line C2, in the portion adjacent to the second minor cutting edge 32. Accordingly, the following operation effect can be obtained.

That is, in this case, the operation effect described in the present embodiment can be more remarkably obtained in that the mounting stability can be improved by causing the short side face mounting wall 53 and the long side face mounting wall 52 of the insert mounting seat 4 to restrict the cutting insert 3. That is, the short side face mounting wall 53 of the insert mounting seat 4 can be brought into contact with the second minor flank face 42 in a wide range, at the position (in the vicinity of the end portion of the tool rotation direction T of the short side face mounting wall 53) apart from the long side face mounting wall 52 of the short side face mounting wall 53. In this manner, it is possible to remarkably increase a restriction force of the cutting insert 3 by using the short side face mounting wall 53 and the long side face mounting wall 52, and thus, it is possible to reliably suppress rattling of the cutting insert 3.

In addition, in the present embodiment, the flank faces (the pair of second minor flank faces 42) of the pair of second minor cutting edges 32 extending toward the mutually opposite sides along the direction of the insert long side face axial line C2 from the pair of second minor cutting edges 32 located at both end edges in the direction of the insert long side face axial line C2 of the short side face 13 are arranged adjacent to each other in the direction of the insert major face axial line C1. Accordingly, the following operation effect can be obtained.

That is, in this case, the pair of second minor flank faces 42 are directly connected and adjacent to each other without interposing other faces therebetween. For example, the flank face (first minor flank face 41) of the first minor cutting edge (flat cutting edge) 31 is not interposed between the second minor flank faces 42. Therefore, according to the above-described configuration, the larger area of the second minor flank face 42 can be secured. In this manner, the short side face mounting wall 53 facing the tool distal end side in the insert mounting seat 4 can be brought into contact with the second minor flank face 42 in a wide range. The above-describe advantageous effect can be more remarkably obtained in that the mounting stability of the cutting insert 3 is improved.

<Second Embodiment>

Next, a cutting insert 30 of an indexable cutting tool according to a second embodiment will be described with reference to FIGS. 17 and 18.

A detailed description of configuration elements the same as those of the above-described embodiment will be omitted, and only different points will be described below.

[Points Different from Those in Above-Described Embodiment]

The indexable cutting tool according to the present embodiment has the tool main body 2 in common with the indexable cutting tool 1 in the above-described embodiment, and has the different cutting insert 30. Specifically, the present embodiment has a different configuration of the cutting insert 30, mainly the short side face 13.

Figure 17:
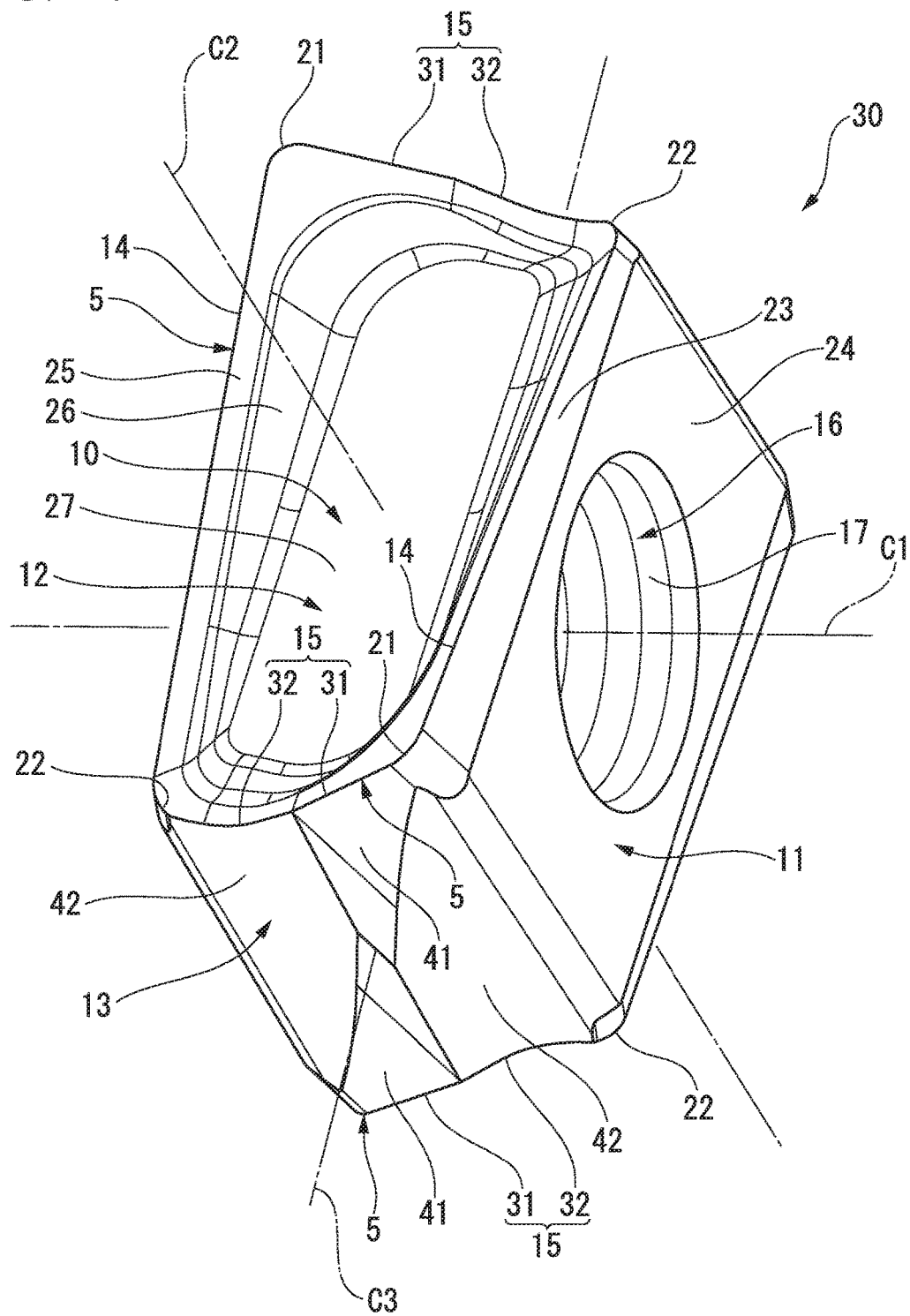
FIG. 17 is a perspective view showing a cutting insert according to a second embodiment.
Figure 18:
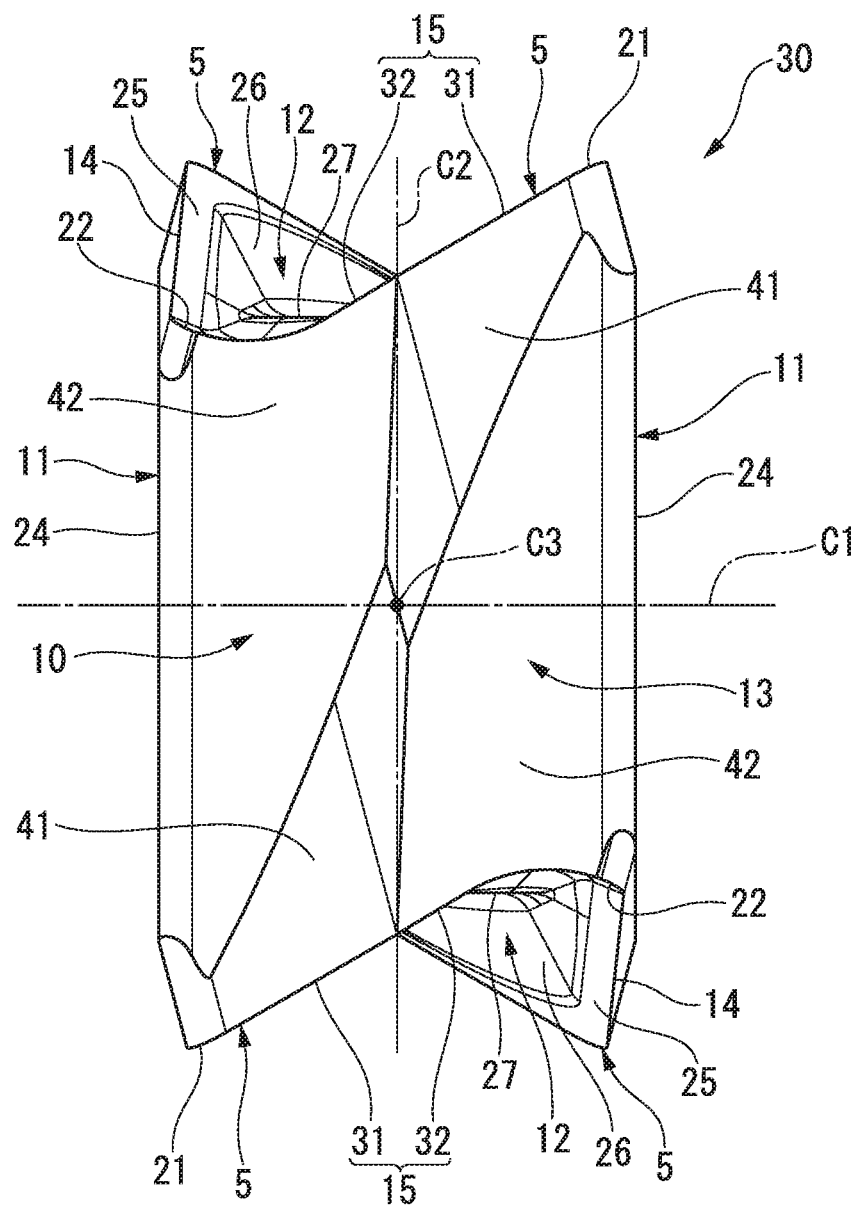
FIG. 18 is a view when the cutting insert is viewed in the direction of the insert short side face axial line (view when the short side face is viewed from the front).
Figure 19:
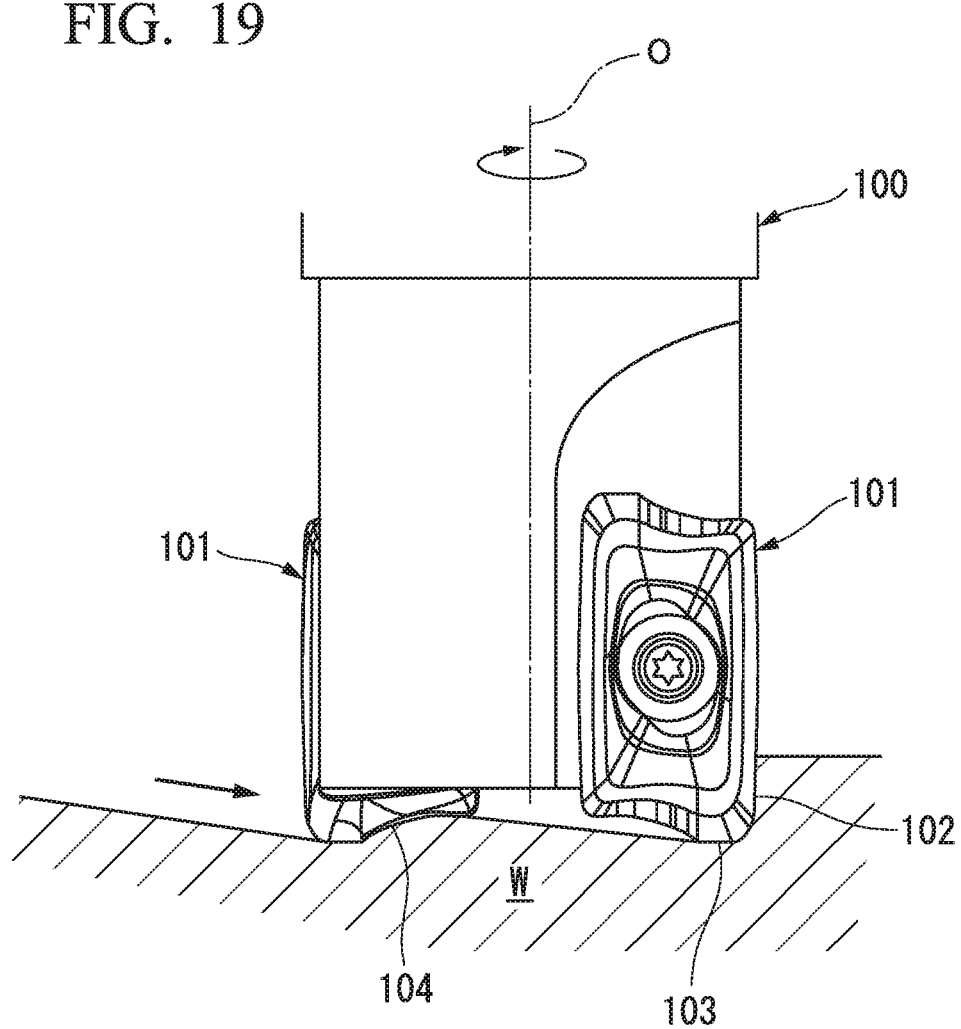
FIG. 19 is a view for describing a ramping operation.

As shown in FIGS. 17 and 18, in the cutting insert 30 according to the present embodiment, the flank faces (the pair of first minor flank faces 41) of the pair of first minor cutting edges 31 extending toward the mutually opposite sides along the direction of the insert long side face axial line C2 from the pair of first minor cutting edges 31 located at both end edges in the direction of the insert long side face axial line C2 of the short side face 13 are connected to each other.

Specifically, in FIG. 18, in the pair of first minor flank faces 41 of the short side face 13, the length (width) decreases in the direction of the insert major face axial line C1, as the first minor flank face 41 extends from each of the first minor cutting edges 31 in the direction of the insert long side face axial line C2. In addition, the pair of first minor flank faces 41 are connected to each other on the insert short side face axial line C3.

In addition, in this manner, the flank faces (the pair of second minor flank faces 42) of the pair of second minor cutting edge 32 extending toward mutually opposite sides along the direction of the insert long side face axial line C2 from the pair of second minor cutting edge 32 located at both end edges in the direction of the insert long side face axial line C2 of the short side face 13 are apart from each other without being connected to each other each.

Then, the pair of first minor flank faces 41 formed on the short side face 13 are formed in mutually different planes. The pair of first minor flank faces 41 of the short side face 13 is not disposed parallel to each other while having mutually different plane inclinations (thus, both of these are not included in the same plane).

Specifically, the flank faces (the pair of first minor flank faces 41) of the pair of first minor cutting edges 31 of the short side face 13 are formed in mutually different planes, although the end portions located on the side opposite to each of the first minor cutting edges 31 along the direction of the insert long side face axial line C2 are connected to each other. The pair of first minor flank faces 41 intersect each other in the connecting portion. That is, the pair of first minor flank faces 41 are connected to each other so as to be twisted via the connecting portion therebetween, and a ridgeline or a valley line is formed in the connecting portion.

In addition, the pair of second minor flank faces 42 formed on the short side face 13 are formed in mutually different planes, and the planes have mutually different inclinations. In addition, the first minor flank face 41 and the second minor flank face 42 are formed in mutually different planes, and the planes have mutually different inclinations.

Therefore, four mutually different planes including at least the pair of first minor flank faces 41 and the pair of second minor flank faces 42 are formed on the short side face 13.

[Operation Effect According to Present Embodiment]

According to the cutting insert 30 and the indexable cutting tool using the cutting insert 30 according to the present embodiment, it is possible to obtain an operation effect the same as that of the above-described embodiment.

<Third Embodiment>

Figure 20:
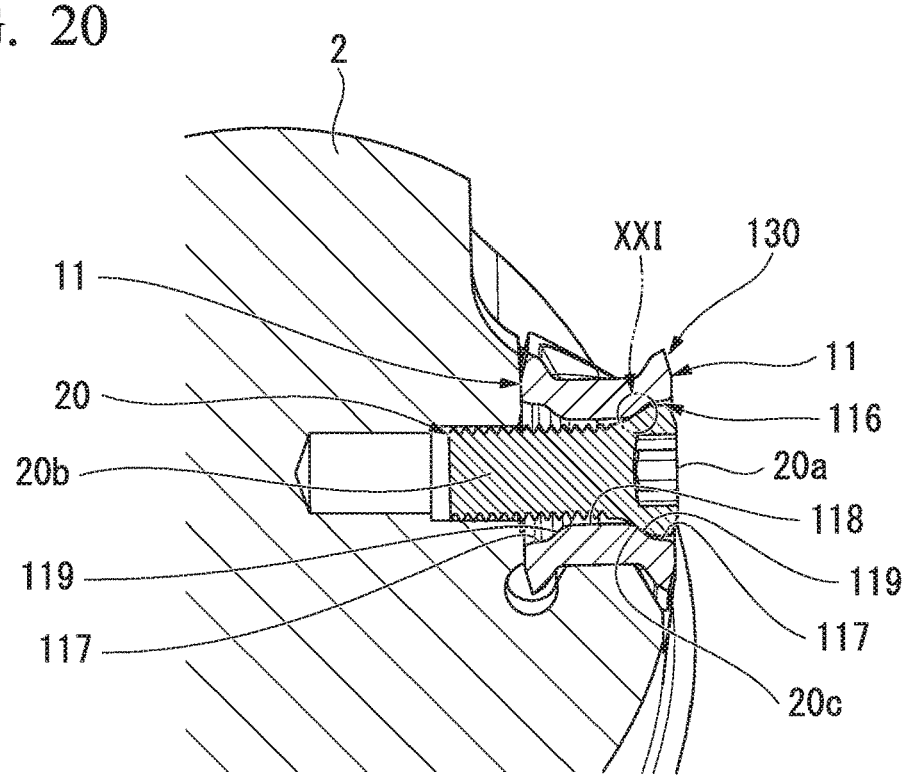
FIG. 20 is a sectional view of an indexable insert tool to which a cutting insert is mounted according to a third embodiment.
Figure 21:
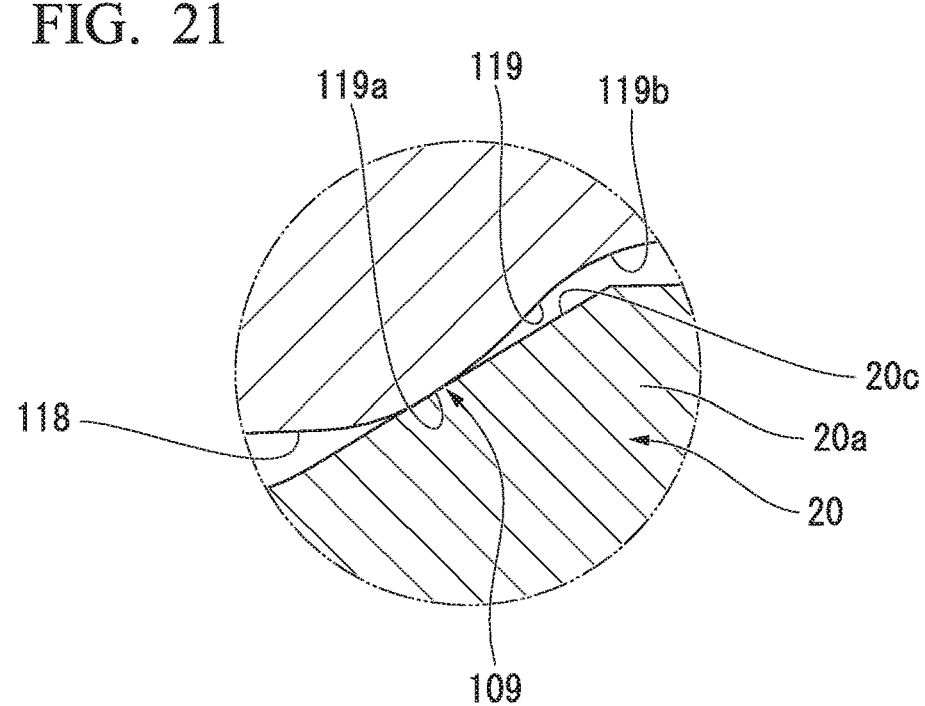
FIG. 21 is an enlarged view of a region XXI in FIG. 20.

A cutting insert 130 of an indexable cutting tool according to a third embodiment of the present invention will be described. FIG. 20 is a sectional view of tan indexable insert tool to which the cutting insert 130 according to the third embodiment is mounted. In addition, FIG. 21 is an enlarged view of a region XXI in FIG. 20.

A detailed description of configuration elements the same as those of the above-described embodiment will be omitted, and only different points will be described below.

The indexable cutting tool according to the present embodiment has the tool main body 2 in common with the indexable cutting tool 1 in the above-described embodiment, and has the different cutting insert 130. Specifically, the present embodiment has a different configuration of a mounting hole 116 of the cutting insert 130.

The cutting insert 130 according to the present embodiment is provided with the mounting hole 116, similarly to the first embodiment. The mounting hole 116 is disposed so as to penetrate in a direction (one direction) orthogonal to the pair of the major faces 11. A clamp screw (fixing member) 20 for fixing the cutting insert 130 to the tool main body 2 is inserted into the mounting hole 116.

The clamp screw 20 has a shaft portion 20b in which a male screw is formed and a head portion (locking portion) 20a located at one end of the shaft portion 20b. The head portion 20a is formed to have a larger diameter than the shaft portion 20b. The head portion 20a has a conical shape. A seat face 20c of the head portion 20a configures a tapered face whose diameter decreases toward a portion connected to the shaft portion 20b.

The mounting hole 116 is provided with a pair of larger-diameter portions 117, a pair of tapered portions 119, and a smaller-diameter portion 118. The pair of larger-diameter portion 117 is open to the major faces 11 respectively facing opposite sides. The smaller-diameter portion 118 is located between the pair of larger-diameter portions 117. The pair of tapered portions 119 is disposed between the larger-diameter portion 117 and the smaller-diameter portion 118, respectively, and connects both of these to each other. One larger-diameter portion 117, one tapered portion 119, the smaller-diameter portion 118, the other tapered portion 119, and the other larger-diameter portion 117 are formed in this order along an inserting direction of the clamp screw 20.

In the tapered portion 119, the diameter of the mounting hole 116 decreases inward from each of the major faces 11.

That is, in the tapered portion 119, the diameter of the mounting hole 116 along the inserting direction of the clamp screw 20.

As shown in FIG. 21, the tapered portion 119 has a first R-portion (curved portion) 119a in an end portion on a side having a small hole diameter (that is, an end portion on the smaller-diameter portion 118 side). The tapered portion 119 is smoothly connected to the smaller-diameter portion 118 via the first R-portion 119a. Similarly, the tapered portion 119 has a second R-portion 119b in an end portion on a side having a large hole diameter (that is, an end portion on the larger-diameter portion 117 side). The tapered portion 119 is smoothly connected to the larger-diameter portion 117 via the second R-portion 119b. The cutting insert 130 comes into contact with a seat face 20c formed in a tapered shape of the clamp screw 20 in the first R-portion 119a.

The tapered portion 119 has a polishing portion 109. The polishing portion 109 is formed in a belt-like shape along the circumferential direction of the tapered portion 119 and in the entire circumference. The cutting insert 130 comes into contact with the seat face 20c having the tapered shape disposed in the head portion 20a of the clamp screw 20 in the polishing portion 109. Therefore, the polishing portion 109 is formed in the first R-portion 119a of at least the tapered portion 119.

The polishing portion 109 is formed by means of blasting or brushing, for example. Arithmetic average roughness Ra of the polishing portion 109 is 0.35 μm or smaller, and is preferably 0.30 μm or smaller. The polishing portion 109 comes into contact with the seat face 20c of the clamp screw 20.

[Operation Effect According to Present Embodiment]

In the cutting insert 130 according to the present embodiment, the mounting hole 116 is disposed so as to penetrate the pair of major faces 11, and a rake face is disposed on a side face connecting peripheral edges of the pair of major faces 11 to each other. That is, the cutting insert 130 is a so-called vertical cutting edge type cutting insert. In this case, strong shear stress is applied to the clamp screw 20 during the tool rotating cutting process. If the diameter of the shaft portion of the clamp screw is increased in order to suppress the breakage of the clamp screw against the strong shear stress, the cutting insert is thinned accordingly. Therefore, there is a problem in that the cutting insert is likely to be cracked.

According to the cutting insert 130 of the present embodiment, the polishing portion 109 is disposed in a portion in contact with the seat face 20c of the clamp screw 20. The stress generated by being fastened to the clamp screw 20 is applied to the portion in contact with the seat face 20c. A defect on the surface of the contact portion is a starting point of cracks. In a cemented carbide alloy used as a general configuration material of the cutting insert 130, a fine defect caused by tungsten carbide grains is formed on the surface. In particular, when the cutting insert of the vertical cutting edge double-sided type is manufactured, a molded body is first manufactured by performing press molding of raw material powder. However, the molding is performed in the direction of the insert long side face axial line C2. Accordingly, a portion around the mounting hole is likely to have low density, and a surface defect caused by the low density is likely to appear after sintering. The polishing portion 109 is disposed in the contact portion. In this manner, it is possible to remove the defect as the starting point of cracks, and to suppress cracking in the cutting insert 130. In addition, the arithmetic average roughness Ra of the polishing portion 109 is set to 0.35 μm or smaller. In this manner, the cracking is more reliably suppressed.

In the cutting insert 130 according to the present embodiment, the polishing portion 109 is disposed in the entire portion of the clamp screw 20 in contact with the head portion 20a. However, as long as the polishing portion 109 is at least partially disposed in the contact portion, a constant advantageous effect is obtained against the cracking.

According to the present embodiment, the tapered portion 119 of the mounting hole 116 comes into contact with the seat face 20c having the tapered shape. In this manner, it is easy to relatively align the center axis of the mounting hole 116 and the center axis of the clamp screw 20 with each other. In addition, the seat face 20c of the clamp screw 20 comes into contact with the first R-portion 119a of the tapered portion 119. Accordingly, it is possible to easily adjust the posture of the cutting insert 130 in fastening the clamp screw 20. However, on the other hand, the seat face 20c comes into contact with the cutting insert 130 in the first R-portion 119a, thereby decreasing a contact area between the cutting insert 130 and the clamp screw 20. In this manner, the stress applied to the cutting insert 130 from the clamp screw 20 increases. According to the present embodiment, the polishing portion 109 is disposed in the contact portion between the cutting insert 130 and the clamp screw 20, and the cracking is suppressed. Even in a case where the stress of the contact portion increases, damage to the cutting insert 130 can be suppressed.

[Other Configuration]

The present invention is not limited to the above-described embodiments, and various modifications can be made without departing from the spirit of the present invention.

For example, in the above-described embodiment, the first minor flank face 41 and the second minor flank face 42 that are formed on the short side face 13 of the cutting inserts 3 and 30 have the rectangular shape. Specifically, the case has been described that both of these are formed in the trapezoidal shape. However, the present invention is not limited thereto. That is, for example, the shape of the first minor flank face 41 and the second minor flank face 42 may be a polygonal shape other than the rectangular shape, an oval shape, or an elliptical shape.

Alternatively, the respective configurations (configuration elements) described above in the embodiments, modification examples, and revisions may be combined with each other within the scope not departing from the gist of the present invention. In addition, additions, omissions, and substitution of the configurations, or other modifications can be made. In addition, the present invention is not limited by the embodiments described above, and is limited by only the appended claims.

APPLICATION EXAMPLE

An application example having the polishing portion 109 in the contact portion (that is, the first R-portion 119a) with the clamp screw 20 in the cutting insert 130 described above in the third embodiment, and a comparative example having no polishing portion are respectively prepared. The arithmetic average roughness Ra of the contact portion is shown in Table 1 in the following paragraph. The arithmetic average roughness Ra is measured in an analysis region of 20 μm×20 μm by using a non-contact laser type measuring device. In addition, a measurement value considering a cutoff value is not corrected.

Four cutting inserts 130 according to the application example and the comparative example are mounted to the tool main body 2 having the diameter of 25 mm. Cutting speed is set to 160 m/min, an axial cutting depth is set to 7.5 mm, and a radial cutting width is set to 12.5 mm. Under these conditions, a cutting test is performed by changing rotation speed (feeding amount per one cutting edge) of the tool main body 2. As the work material, SCM 440 is used.

If the feeding amount per one cutting edge is increased, a load applied to the cutting insert 130 is increased, and the cutting insert 130 is likely to be damaged. In the cutting test, the breakage of the cutting insert 130 is confirmed when the feeding amount per one cutting edge is changed, and the feeding amounts when damaged are summarized in Table 1. In Table 1, "O" indicates that there is no damage after 1 pass is set to 400 mm and a 5-pass cutting test is performed. In addition, "X" indicates that damage intermediately occurs.

TABLE 1

| | Arithmetic Average Roughness [μm] of Contact Portion Ra | Cutting Test (Feeding Amount per One Cutting Edge) [mm] | | | | |
|---|---|---|---|---|---|---|
| | | 0.15 | 0.20 | 0.25 | 0.30 | 0.35 |
| Application Example 1 | 0.28 | O | O | O | O | X |
| Application Example 2 | 0.33 | O | O | O | X | X |
| Comparative Example 1 | 0.37 | O | X | X | X | X |
| Comparative Example 2 | 0.45 | O | X | X | X | X |

As shown in Table 1, in the cutting insert 130 according to the application example, the damage can be suppressed, compared to the comparative example. Based on this result, it is confirmed that damage of the cutting insert 130 can be suppressed by disposing the polishing portion in the contact portion between the cutting insert 130 and the clamp screw 20.

INDUSTRIAL APPLICABILITY

As described above, according to the cutting insert and the indexable cutting tool of the present invention, it is possible to perform not only the face milling operation or the shoulder milling operation, but also the ramping operation. According to the cutting insert and the indexable cutting tool of the present invention, the mounting stability of the cutting insert mounted to the insert mounting seat during the tool rotating cutting process can be improved and the cutting performance can be improved.

REFERENCE SIGNS LIST

1 INDEXABLE CUTTING TOOL
2 TOOL MAIN BODY
3, 30, 130 CUTTING INSERT
4 INSERT MOUNTING SEAT
10 SIDE FACE
11 MAJOR FACE (MAJOR FLANK FACE)
12 LONG SIDE FACE (RAKE FACE)
13 SHORT SIDE FACE (MINOR FLANK FACE)
14 MAJOR CUTTING EDGE
15 MINOR CUTTING EDGE
16, 116 MOUNTING HOLE
20 CLAMP SCREW (FIXING MEMBER)
20a HEAD PORTION (LOCKING PORTION)
21 CORNER CUTTING EDGE
31 FIRST MINOR CUTTING EDGE
32 SECOND MINOR CUTTING EDGE
41 FIRST MINOR FLANK FACE (FLANK FACE OF FIRST MINOR CUTTING EDGE)
42 SECOND MINOR FLANK FACE (FLANK FACE OF SECOND MINOR CUTTING EDGE)
51 MAJOR FACE MOUNTING WALL
52 LONG SIDE FACE MOUNTING WALL
53 SHORT SIDE FACE MOUNTING WALL
119 TAPERED PORTION
119a FIRST R-PORTION (CURVED PORTION)
C1 INSERT MAJOR FACE AXIAL LINE
C2 INSERT LONG SIDE FACE AXIAL LINE
C3 INSERT SHORT SIDE FACE AXIAL LINE
O TOOL AXIAL LINE
T TOOL ROTATION DIRECTION

What is claimed is:

1. A cutting insert formed in a rectangular plate shape and a reversibly symmetrical shape, comprising:
a pair of major faces serving as front and rear faces of the cutting insert;
a side face that includes a pair of long side faces and a pair of short side faces connecting the pair of long side faces to each other, and that connects peripheral edges of the pair of major faces to each other;
a major cutting edge formed in an intersection ridge portion between the major face and the long side face; and
a minor cutting edge formed in an intersection ridge portion between the long side face and the short side face,
wherein an imaginary straight line passing through each center of the pair of major faces is set as an insert major face axial line,
wherein an imaginary straight line passing through each center of the pair of long side faces is set as an insert long side face axial line,
wherein an imaginary straight line passing through each center of the pair of short side faces is set as an insert short side face axial line,
wherein the minor cutting edge has a first minor cutting edge that is connected to the major cutting edge via a corner cutting edge, and a second minor cutting edge that is connected to an end portion of the first minor cutting edge on a side opposite to the major cutting edge, and that extends so as to be inclined inward of the insert in a direction of the insert short side face axial line, as the second minor cutting edge extends from the end portion of the first minor cutting edge in a direction of the insert major face axial line, in a directional view of the insert long side face axial line,
wherein a flank face of the second minor cutting edge formed on the short side face is inclined outward of the insert in the direction of the insert short side face axial line, as the flank face extends from the second minor cutting edge in the direction of the insert long side face axial line, in a directional view of the insert major face axial line, and is inclined outward of the insert in the direction of the insert short side face axial line, as the flank face extends from the major face adjacent to the flank face of the second minor cutting edge in the direction of the insert major face axial line, in a directional view of the insert long side face axial line,
wherein a length of a flank face of the first minor cutting edge formed on the short side face is shortened in the direction of the insert major face axial line, as the flank face extends from the first minor cutting edge in the direction of the insert long side face axial line, in a directional view of the insert short side face axial line, and wherein the flank faces of the pair of first minor cutting edges formed on the short side face are formed in mutually different planes.

2. The cutting insert according to claim 1,
wherein the flank face of the second minor cutting edge formed on the short side face does not reach the first minor cutting edge located at an end edge on a side opposite to the second minor cutting edge in the direction of the insert long side face axial line, on the short side face.

3. The cutting insert according to claim 1,
wherein the major face is inclined outward of the insert in the direction of the insert major face axial line, as the major face extends from the major cutting edge in the direction of the insert long side face axial line, in a directional view of the insert short side face axial line.

4. The cutting insert according to claim 1,
wherein a length in the direction of the insert major face axial line on the flank face of the second minor cutting edge increases in a portion adjacent to the second minor cutting edge, compared to an end portion of the flank face that is located on a side opposite to the second minor cutting edge in the direction of the insert long side face axial line.

5. The cutting insert according to claim 1,
wherein the flank faces of the pair of first minor cutting edges extending from the pair of first minor cutting edges located at both end edges in the direction of the insert long side face axial line of the short side face toward mutually opposite sides along the direction of the insert long side face axial line are connected to each other.

6. The cutting insert according to claim 1,
wherein the flank faces of the pair of second minor cutting edges extending from the pair of second minor cutting edges located at both end edges in the direction of the insert long side face axial line of the short side face toward mutually opposite sides along the insert long side face axial line are arranged to be adjacent to each other in the direction of the insert major face axial line.

7. The cutting insert according to claim 1,
wherein a mounting hole penetrating in one direction is disposed, a fixing member having a shaft portion and a locking portion located at one end of the shaft portion is inserted into the mounting hole, and is fixed to the tool main body rotating around a tool axial line, wherein a tapered portion that decreases a diameter of the mounting hole along an inserting direction of the fixing member is disposed in the mounting hole, and wherein the tapered portion at least partially has a polishing portion in a portion in contact with the locking portion of the fixing member.

8. The cutting insert according to claim 7,
wherein the mounting hole is disposed by penetrating the pair of major faces, and
wherein a rake face is disposed on the side face connecting peripheral edges of the pair of major faces to each other.

9. The cutting insert according to claim 7,
wherein the mounting hole has a smaller-diameter portion located at an end portion on a side where a hole diameter of the tapered portion is small, and
wherein the tapered portion has a curved portion smoothly connected to the smaller-diameter portion, and comes into contact with the locking portion of the fixing member in the curved portion.

10. The cutting insert according to claim 7,
wherein arithmetic average roughness Ra of the polishing portion is equal to or smaller than 0.35 μm.

11. The cutting insert according to claim 7,
wherein the mounting hole is disposed by penetrating the pair of major faces, and
wherein the mounting hole is provided with a pair of the tapered portions whose diameter decreases inward from each of the major faces.

12. An indexable cutting tool comprising:
a tool main body rotated around a tool axial line;
a recessed insert mounting seat formed in a tip outer peripheral portion of the tool main body; and
a cutting insert detachably mounted to the insert mounting seat,
wherein as the cutting insert, the cutting insert according to claim 1 is used, and
wherein the insert mounting seat has a major face mounting wall that faces outward in a tool radial direction orthogonal to a tool axial line, and that abuts against the major face, a long side face mounting wall that faces a tool rotation direction in a tool circumferential direction around the tool axial line, and that abuts against the long side face, and a short side face mounting wall that faces a distal end side in a direction of the tool axial line, and that abuts against the flank face of the second minor cutting edge located outward in the tool radial direction, in the flank faces of the pair of second minor cutting edges formed on the short side face.

* * * * *